US011958138B2

(12) United States Patent
Hato et al.

(10) Patent No.: US 11,958,138 B2
(45) Date of Patent: Apr. 16, 2024

(54) JOINT METHOD

(71) Applicant: IHI Corporation, Tokyo (JP)

(72) Inventors: Eriko Hato, Tokyo (JP); Shoichi Nonomura, Tokyo (JP); Naoyuki Matsumoto, Tokyo (JP); Tetsurou Yamazaki, Tokyo (JP); Tomohiro Sugino, Tokyo (JP); Koutarou Inose, Tokyo (JP)

(73) Assignee: IHI Corporation, Tokyo (JP)

( * ) Notice: Subject to any disclaimer, the term of this patent is extended or adjusted under 35 U.S.C. 154(b) by 340 days.

(21) Appl. No.: 17/233,631

(22) PCT Filed: Oct. 25, 2019

(86) PCT No.: PCT/JP2019/041912
§ 371 (c)(1),
(2) Date: Apr. 19, 2021

(87) PCT Pub. No.: WO2020/085492
PCT Pub. Date: Apr. 30, 2020

(65) Prior Publication Data
US 2022/0080532 A1  Mar. 17, 2022

(30) Foreign Application Priority Data
Oct. 25, 2018 (JP) .................................. 2018-200600

(51) Int. Cl.
B23K 33/00 (2006.01)
B22F 10/28 (2021.01)
(Continued)

(52) U.S. Cl.
CPC ............ *B23K 33/004* (2013.01); *B22F 10/28* (2021.01); *B23K 26/342* (2015.10); *B23K 31/022* (2013.01); *B33Y 10/00* (2014.12)

(58) Field of Classification Search
CPC . B22F 10/28; B23K 2101/18; B23K 2103/04; B23K 2103/10; B23K 2103/13;
(Continued)

(56) References Cited

U.S. PATENT DOCUMENTS

| 5,183,989 A | 2/1993 | Sanders et al. |
| 5,250,783 A | 10/1993 | Nishi et al. |

(Continued)

FOREIGN PATENT DOCUMENTS

| CN | 108067732 A * | 5/2018 |
| DE | 102004032975 A1 | 2/2006 |

(Continued)

OTHER PUBLICATIONS

Extended European Search Report dated Jun. 29, 2022 for European Patent Application No. 19875516.7.

*Primary Examiner* — Dana Ross
*Assistant Examiner* — Joe E Mills, Jr.
(74) *Attorney, Agent, or Firm* — Volpe Koenig

(57) ABSTRACT

A joint method includes a groove formation step of removing part of a first projection and part of the second projection to form a groove region between the first projection and the second projection, a first welding step of joining a first member and a second member to each other by butt welding, and a second welding step of filling the groove region by buildup welding. The groove formation step forms a first inclined surface in the first projection facing the groove region to be gradually distant from a joint position joined with the second projection so as to be closer to an outer surface of the first projection, and forms a second inclined surface in the second projection facing the groove region to be gradually distant from the joint position joined with the first projection so as to be closer to an outer surface of the second projection.

10 Claims, 13 Drawing Sheets

(51) Int. Cl.
*B23K 26/342* (2014.01)
*B23K 31/02* (2006.01)
*B33Y 10/00* (2015.01)

(58) Field of Classification Search
CPC ............ B23K 2103/26; B23K 26/0006; B23K 26/0884; B23K 26/26; B23K 26/32; B23K 26/34; B23K 26/342; B23K 26/60; B23K 31/022; B23K 33/004; B33Y 10/00; Y02P 10/25
See application file for complete search history.

(56) References Cited

U.S. PATENT DOCUMENTS

| | | | |
|---|---|---|---|
| 2008/0128053 A1* | 6/2008 | Jansen | C21D 9/34 219/121.64 |
| 2008/0244905 A1 | 10/2008 | Meier | |
| 2013/0140868 A1* | 6/2013 | Muck | B60N 2/682 219/121.85 |
| 2015/0209893 A1 | 7/2015 | Hori et al. | |

FOREIGN PATENT DOCUMENTS

| | | |
|---|---|---|
| JP | 58-218391 A | 12/1983 |
| JP | 05-057467 A | 3/1993 |
| JP | 07-132386 A | 5/1995 |
| JP | 09-132386 A | 5/1997 |
| JP | 3854490 B | 12/2006 |
| JP | 5000982 B | 8/2012 |
| JP | 2015-199119 A | 11/2015 |
| JP | 2016-190254 A | 11/2016 |

* cited by examiner

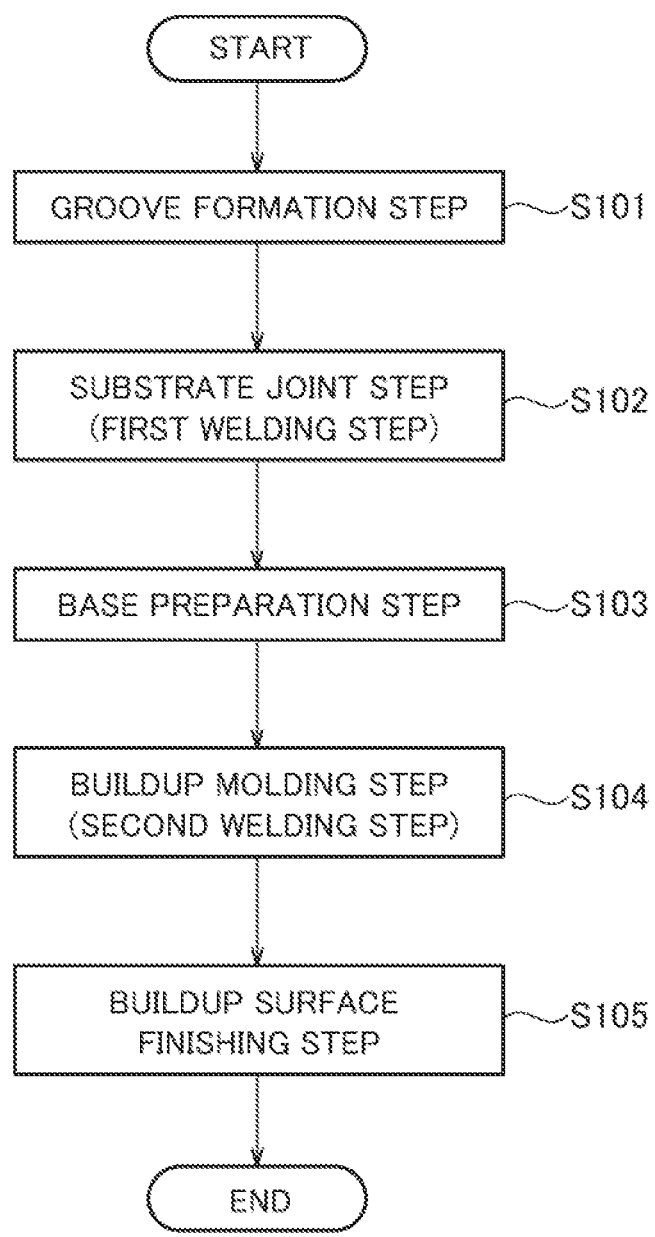

FIG. 10A
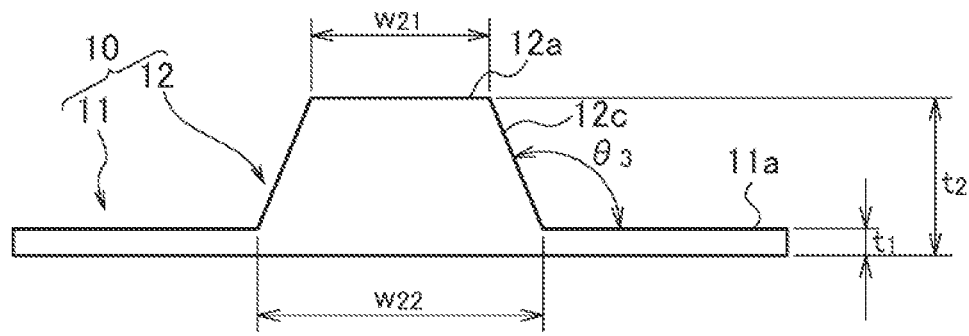
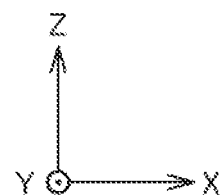
FIG. 10B
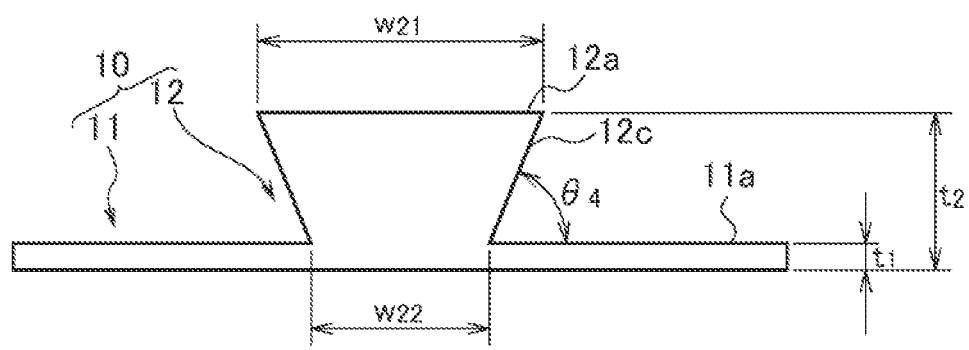
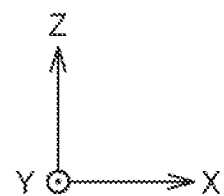

FIG. 15
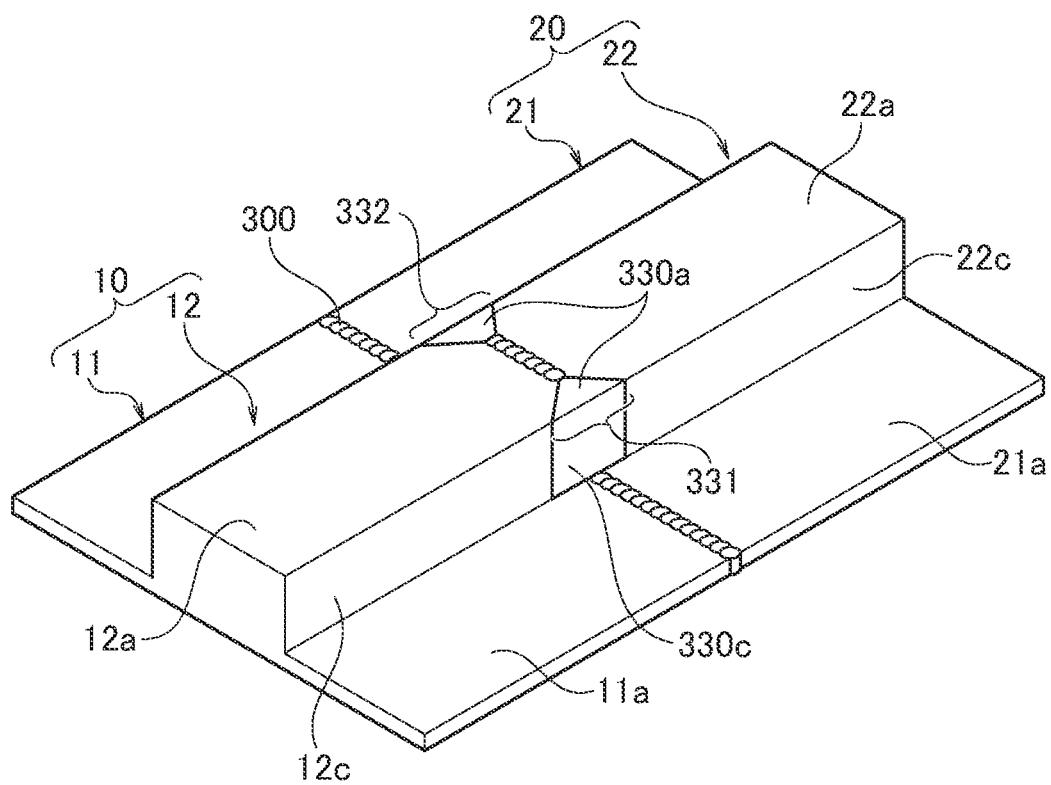
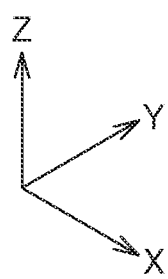

JOINT METHOD

CROSS REFERENCE TO RELATED APPLICATIONS

This application is a continuation application of International Application No. PCT/JP2019/041912, filed on Oct. 25, 2019, which claims priority to Japanese Patent Application No. 2018-200660, filed on Oct. 25, 2018, the entire contents of which are incorporated by reference herein.

BACKGROUND

1. Technical Field

The present disclosure relates to a joint method for joining components to each other by welding.

2. Description of the Related Art

A method is known that joins metallic components to each other by butt welding. Japanese Unexamined Patent Application Publication No. H7-132386 (Patent Literature 1) discloses a welding method of joining components having different thicknesses to each other by butt welding. The welding method disclosed in Patent Literature 1 is used for a case in which the thickness of one component is different from the thickness of the other component, but is not applied to a case in which the respective components have different thicknesses depending on the parts, namely, the thickness of each component varies depending on the parts at the joint position.

SUMMARY

When the components each having the thickness that varies depending on the parts are joined together by the butt welding using a laser beam as a heat source as disclosed in Patent Literature 1, the welding conditions such as a welding speed and a laser output need to be changed depending on the thickness at the joint position. It is actually difficult to continuously change the welding conditions. The change of the welding conditions in accordance with the thickness at the joint position sometimes would not be available particularly depending on a difference in the thicknesses at the joint position or a shape at the joint surface.

An object of the present disclosure is to provide a joint method having the advantage of expanding an application range of a case upon joint between components each having a thickness that varies depending on parts at a joint position.

An aspect of the present disclosure provides a joint method of bringing a first member including a first substrate and a first projection projecting from the first substrate into contact with a second member including a second substrate and a second projection projecting from the second substrate to be joined to each other, the method including a groove formation step of removing part of the first projection opposed to the second projection and part of the second projection opposed to the first projection to form a groove region between the first projection and the second projection, a first welding step of joining the first member and the second member to each other by butt welding after the groove formation step, and a second welding step of filling the groove region by buildup welding after the first welding step, wherein the groove formation step forms a first inclined surface in the first projection facing the groove region to be gradually distant from a joint position joined with the second projection so as to be closer to an outer surface of the first projection, and forms a second inclined surface in the second projection facing the groove region to be gradually distant from the joint position joined with the first projection so as to be closer to an outer surface of the second projection.

In the joint method, the first inclined surface may be a surface gradually distant from the joint position joined with the second projection as the first inclined surface is separate from the first substrate, and the second inclined surface may be a surface gradually distant from the joint position joined with the first projection as the second inclined surface is separate from the second substrate. The butt welding may be executed by use of a first welding device using high-density energy as a heat source. The buildup welding may be executed by use of a metal deposition-type second welding device using a laser beam as a heat source. The second welding device may include a laser torch for emitting the laser beam, an inclination angle of the first inclined surface with respect to a projecting direction of the first projection and an inclination angle of the second inclined surface with respect to a projecting direction of the second projection may each be equal to an inclination angle of an outer wall composing a tip end part of the laser torch, or may each be greater than the inclination angle of the outer wall, and a gap between the first inclined surface and the second inclined surface may be determined such that the laser torch emitting the laser beam is not brought into contact with the first inclined surface or the second inclined surface. The first inclined surface may be continuously connected to a surface of the first substrate via a first curved surface, and the second inclined surface may be continuously connected to a surface of the second substrate via a second curved surface. The first inclined surface may be a surface inclined to a joint surface perpendicular to a joint direction between the first projection and the second projection about a first axis intersecting a surface of the first substrate, and the second inclined surface may be a surface inclined to the joint surface about a second axis intersecting a surface of the second substrate. The first projection may include a first projection end surface opposed to the second member, the second projection may include a second projection end surface opposed to the first member, the groove formation step may leave part of the first projection end surface to form the first inclined surface and leave part of the second projection end surface to form the second inclined surface, and the remaining first projection end surface and the remaining second projection end surface may be opposed to each other. The joint method may further include, before the second welding step, a base preparation step of flattening unevenness caused at a welded part welded in the first welding step to prepare a base corresponding to a part to be welded in the second welding step. The joint method may further include, after the second welding step, a buildup surface finishing step of finishing a surface of a buildup part filled and molded in the groove region in the second welding step.

BRIEF DESCRIPTION OF THE DRAWINGS

FIG. 2 is a flowchart showing a process of a joint method according to some embodiments.

FIG. 10A is a view showing other configurations of joint targets according to some embodiments.

FIG. 10B is a view showing other configurations of joint targets according to some embodiments.

FIG. 15 is a view showing a state of the joint targets after executing a buildup surface finishing step in the joint method according to the second embodiment.

DESCRIPTION OF THE EMBODIMENTS

Figure 1:
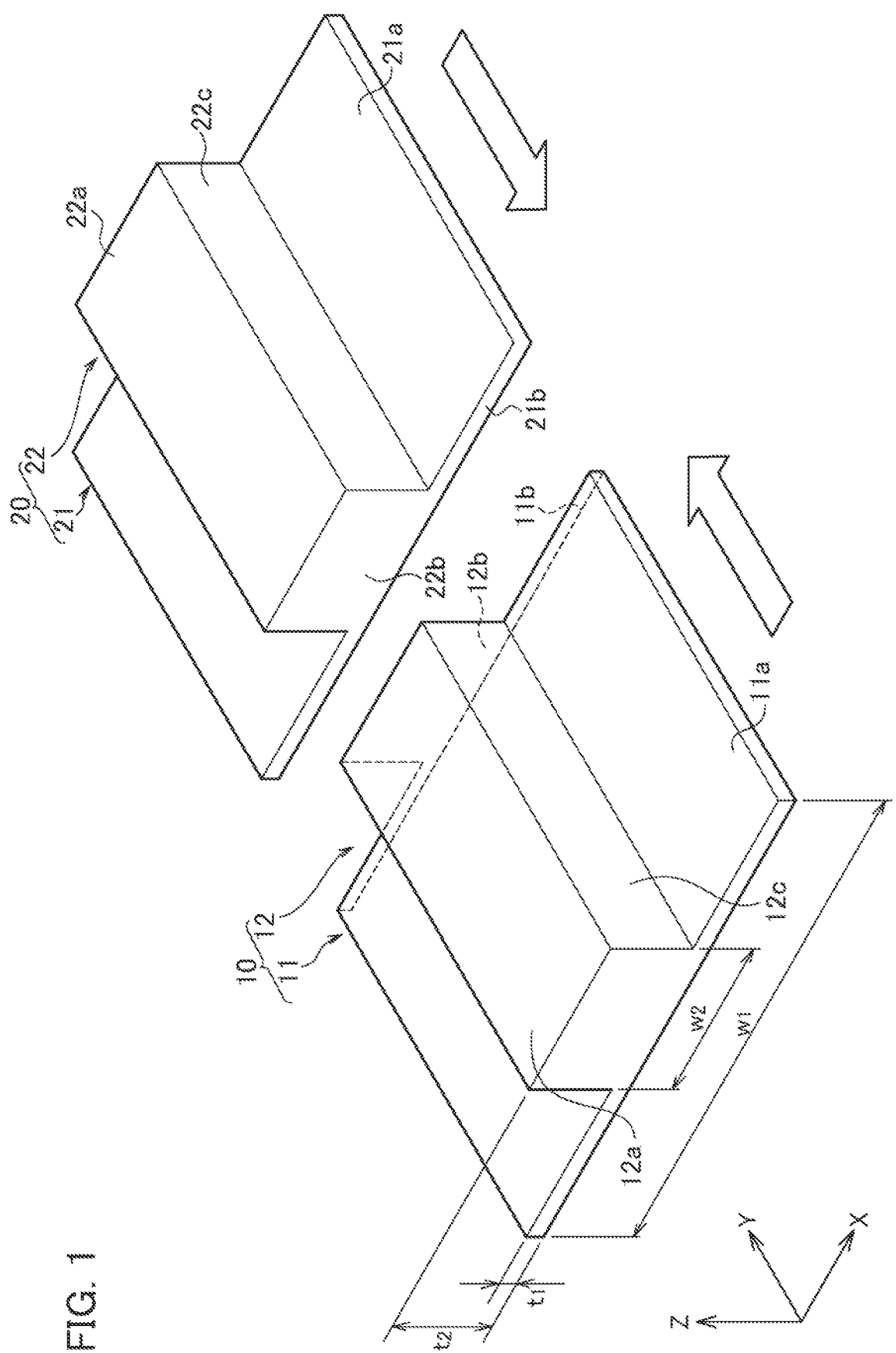
FIG. 1 is a view showing a configuration of joint targets according to some embodiments.

Explanatory embodiments will be described in detail below with reference to the drawings. The following dimensions, materials, and specific numerical values described in the embodiments are shown for illustration purposes, and the present disclosure is not limited thereto unless otherwise specified. The elements having substantially the same functions and structures are denoted by the same reference numerals, and overlapping explanations are not repeated below. The elements described below but not related directly to the present disclosure are not shown in the drawings. In the following explanations of the drawings, a vertical direction is defined as a Z-axis, a direction perpendicular to the Z-axis on a horizontal plane is defined as an X-axis, and a direction perpendicular to the X-axis on the horizontal plane is defined as a Y-axis.

Joint Targets

FIG. 1 is a perspective view showing an example of targets to be joined together by use of a joint method according to some embodiments. A first member 10 is one of the joint targets, and a second member 20 is the other joint target. The joint method according to some embodiments joins at least part of the first member 10 and part of the second member 20 to each other. When the first member 10 and the second member 20 are arranged to face each other as illustrated in FIG. 1, a joint direction between the first member 10 and the second member 20 corresponds to the Y direction as indicated by the arrows in FIG. 1. The first member 10 and the second member 20 are each made of a steel material such as carbon steel and stainless steel, for example. The material used for forming the first member 10 and the second member 20 is not limited to the steel material, and may be a metallic material such as an aluminum-based material, a titanium-based material, and a nickel-based material. The following illustrations are based on a definition regarding the configuration of the first member 10 and the second member 20 in which a thickness direction corresponds to the Z direction and a width direction corresponds to the X direction.

The first member 10 includes a first substrate 11 and a first projection 12.

The first substrate 11 is a plate-like member having a thickness $t_1$. A main plane surface of the first substrate 11 is parallel to the X-Y plane surface. The first substrate 11 includes a first plane surface 11a, which is one of the two main plane surfaces. In the state in which the joint direction is defined in the Y direction, the first substrate 11 includes a first substrate end surface 11b, which is one of the four side surfaces, parallel to the X-Z plane surface and opposed to the second member 20.

The first projection 12 is a cuboid part projecting upward from the first plane surface 11a in the Z direction. A thickness $t_2$ of the first projection 12 is greater than the thickness $t_1$ of the first substrate 11. A width $w_2$ of the first projection 12 is narrower than a width $w_1$ of the first substrate. In the state in which the joint direction is defined in the Y direction, the first projection 12 includes a first projection end surface 12b, which is one of the four side surfaces, parallel to the X-Z plane surface and opposed to the second member 20. In some embodiments, part of the first projection 12 including the first projection end surface 12b is actually removed when the first member 10 and the second member 20 are joined together. The first substrate end surface 11b of the first substrate 11 is continuously integrated with the first projection end surface 12b of the first projection 12 on the same X-Z plane surface, as illustrated in FIG. 1, before part of the first projection 12 is removed. The first member 10 has a substantially inverted T-shape on a virtual joint surface to be joined to the second member 20 as viewed in the Y direction.

The second member 20 includes a second substrate 21 and a second projection 22. In some embodiments, the second member 20 makes a symmetrical shape with the first member 10 about the joint position therebetween.

The second substrate 21 is a plate-like member having a thickness $t_1$ and a width $w_1$, as in the case of the first substrate 11 of the first member 10. The second substrate 21 includes a second plane surface 21a, which is one of the two main plane surfaces. In the state in which the joint direction is defined in the Y direction, the second substrate 21 includes a second substrate end surface 21b, which is one of the four side surfaces, parallel to the X-Z plane surface and opposed to the first member 10.

The second projection 22 is a cuboid part projecting upward from the second plane surface 21a in the Z direction, as in the case of the first projection 12 of the first member 10. The second projection 22 has the same thickness $t_2$ as the first projection 12. The second projection 22 has the same width $w_2$ as the first projection 12. In the state in which the joint direction is defined in the Y direction, the second projection 22 includes a second projection end surface 22b, which is one of the four side surfaces, parallel to the X-Z plane surface and opposed to the first member 10. As in the case of the first member 10, part of the second projection 22 including the second projection end surface 22b is actually removed when the first member 10 and the second member 20 are joined together. The second substrate end surface 21b of the second substrate 21 is continuously integrated with the second projection end surface 22b of the second projection 22 on the same X-Z plane surface, as illustrated in FIG. 1, before part of the second projection 22 is removed. The second member 20 also has a substantially inverted T-shape on the virtual joint surface to be joined to the first member 10 as viewed in the Y direction.

One of the joint targets and the other joint target each have the thickness that varies depending on the parts at the joint position. In some embodiments, the first member 10 as one of the joint targets has the thickness that differs between the first substrate 11 having the first substrate end surface 11b and the first projection 12 having the first projection end surface 12b. Similarly, the second member 20 as the other joint target has the thickness that differs between the second substrate 21 having the second substrate end surface 21b and the second projection 22 having the second projection end surface 22b.

First Embodiment

FIG. 2 is a flowchart showing a process of a joint method according to a first embodiment. The joint method according to the first embodiment includes a groove formation step S101, a substrate joint step S102, a base preparation step S103, a buildup molding step S104, and a buildup surface finishing step S105.

Figure 3A:
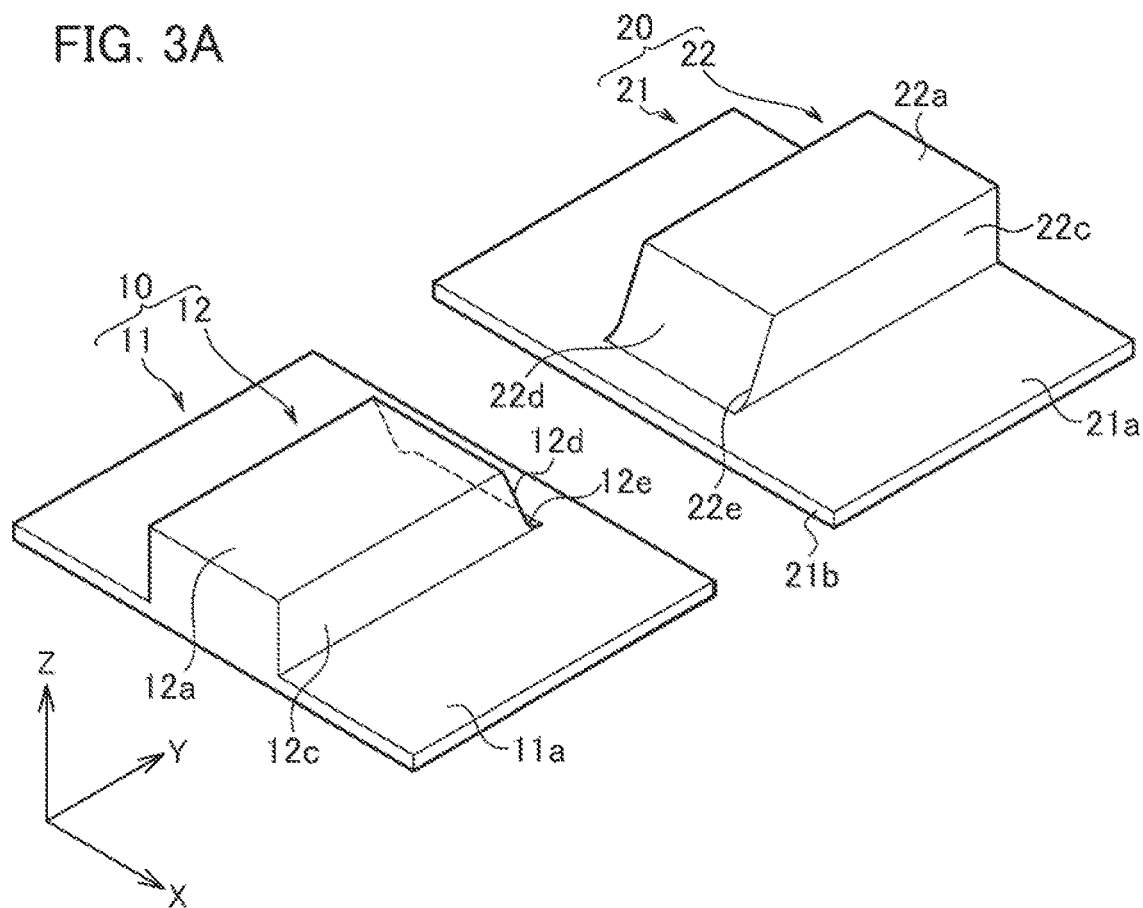
FIG. 3A is a view for explaining a groove formation step in a joint method according to a first embodiment.
Figure 3B:
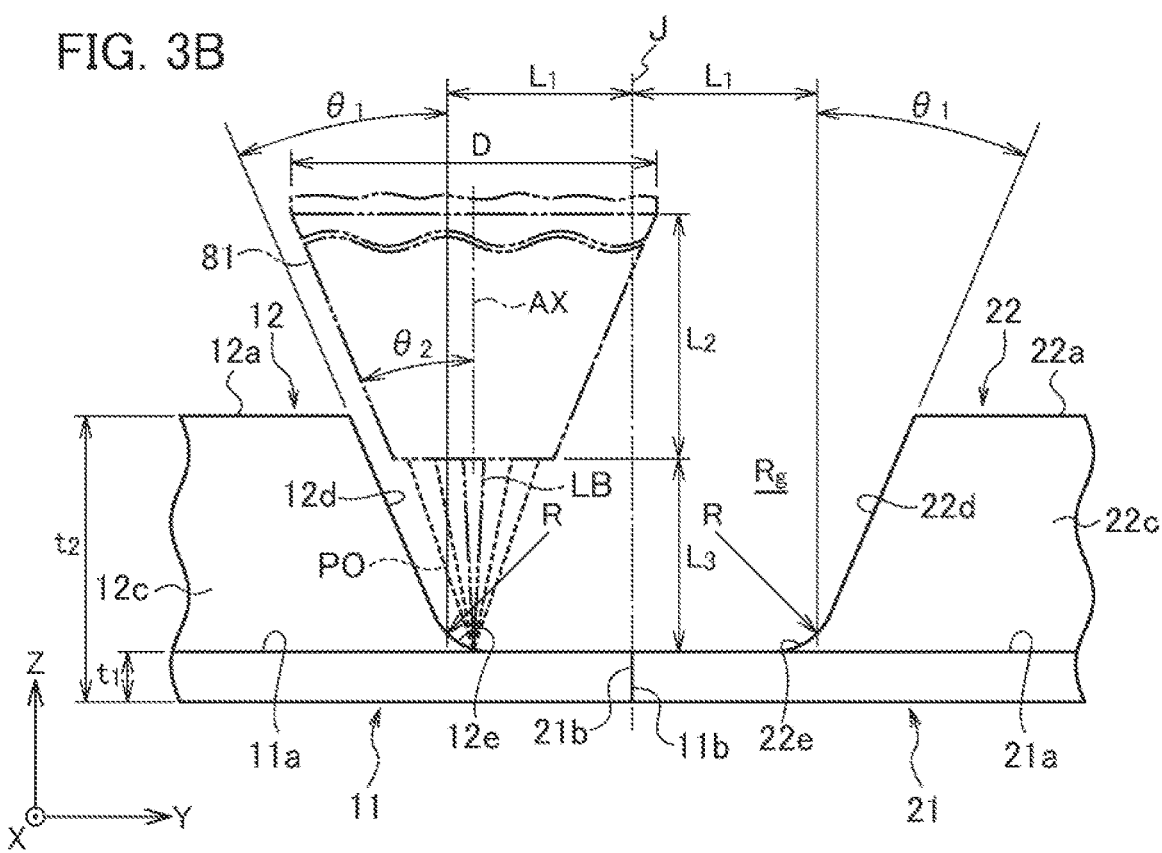
FIG. 3B is a view for explaining a groove formation step in a joint method according to a first embodiment.

FIGS. 3A and 3B are views for explaining the groove formation step S101. FIG. 3A is a perspective view showing a state of the first member 10 and the second member 20 after the groove formation step S101 is executed. FIG. 3B is an enlarged side view showing a state of the first member 10 and the second member 20 in a case in which the first substrate end surface 11b and the second substrate end surface 21b are brought into contact with each other after the execution of the groove formation step S101. FIG. 3B indicates the joint position J between the first member 10 and the second member 20 by the dash-dotted line. The joint position J is a plane surface parallel to the X-Z plane surface and including the first substrate end surface 11b and the second substrate end surface 21b.

The groove formation step S101 is a step of removing part of the first projection 12 opposed to the second projection 22 and part of the second projection 22 opposed to the first projection 12 so as to form a groove region $R_g$ between the first projection 12 and the second projection 22.

The groove region $R_g$ is formed such that part of the first projection 12 and part of the second projection 22 are cut off in the X direction from the first member 10 and the second member 20 in the state shown in FIG. 1, for example. As illustrated in FIG. 3B, the first projection 12 is first partly removed toward a position by a distance $L_1$ from the joint position J in the Y direction. The first member 10 in this state substantially only includes the first substrate 11 within the distance $L_1$ from the joint position J. The remaining part of the first projection 12 facing the groove region $R_g$ is further partly removed so as to be provided with a first inclined surface 12d gradually distant from the joint position J in the Y-axis direction and inclined toward the direction away from the first substrate 11 in the Z-axis direction about the position having the distance $L_1$ from the joint position J. FIG. 3B indicates an inclination angle of the first inclined surface 12d with respect to the projecting direction of the first projection 12 by $\theta_1$. The first inclined surface 12d is integrally connected to the first plane surface 11a via a first curved surface 12e having a radius of curvature R. Although not illustrated, the center of the radius of curvature R is on the X axis.

Similarly, the second projection 22 is first partly removed toward a position by a distance $L_1$ from the joint position J in the Y direction. The second member 20 in this state substantially only includes the second substrate 21 within the distance $L_1$ from the joint position J. The remaining part of the second projection 22 facing the groove region $R_g$ is further partly removed so as to be provided with a second inclined surface 22d gradually distant from the joint position J in the Y-axis direction and inclined toward the direction away from the second substrate 21 in the Z-axis direction about the position having the distance $L_1$ from the joint position J. FIG. 3B indicates an inclination angle of the second inclined surface 22d with respect to the projecting direction of the second projection 22 by $\theta_1$. The second inclined surface 22d is integrally connected to the second plane surface 21a via a second curved surface 22e having a radius of curvature R. The center of the radius of curvature R in the second curved surface 22e is also on the X axis.

In the present embodiment, the removed part in the first projection 12 makes a substantially symmetrical shape with the removed part in the second projection 22 about the joint position J. The combination of the part removed from the first projection 12 and the part removed from the second projection 22 serve as the groove region $R_g$.

The groove formation step S101 may employ any method that can cut off part of the first projection 12 and part of the second projection 22. For example, the first member 10 and the second member 20, when formed by use of a typical cutting processing device, may be simultaneously provided with the groove region $R_g$ upon the cutting processing. Alternatively, the first member 10 and the second member 20, when formed by a typical pressing device or casting device, may be preliminarily designed so as to be provided with the groove region $R_g$.

The distance $L_1$ and the inclination angle $\theta_1$ defining the shape of the groove region $R_g$ in the present embodiment are determined according to a shape of a laser torch included in a second welding device used for welding in the buildup molding step S104 executed afterward. The possible dimensions regarding the distance $L_1$ and the inclination angle $\theta_1$ are described in detail below.

Figure 4A:
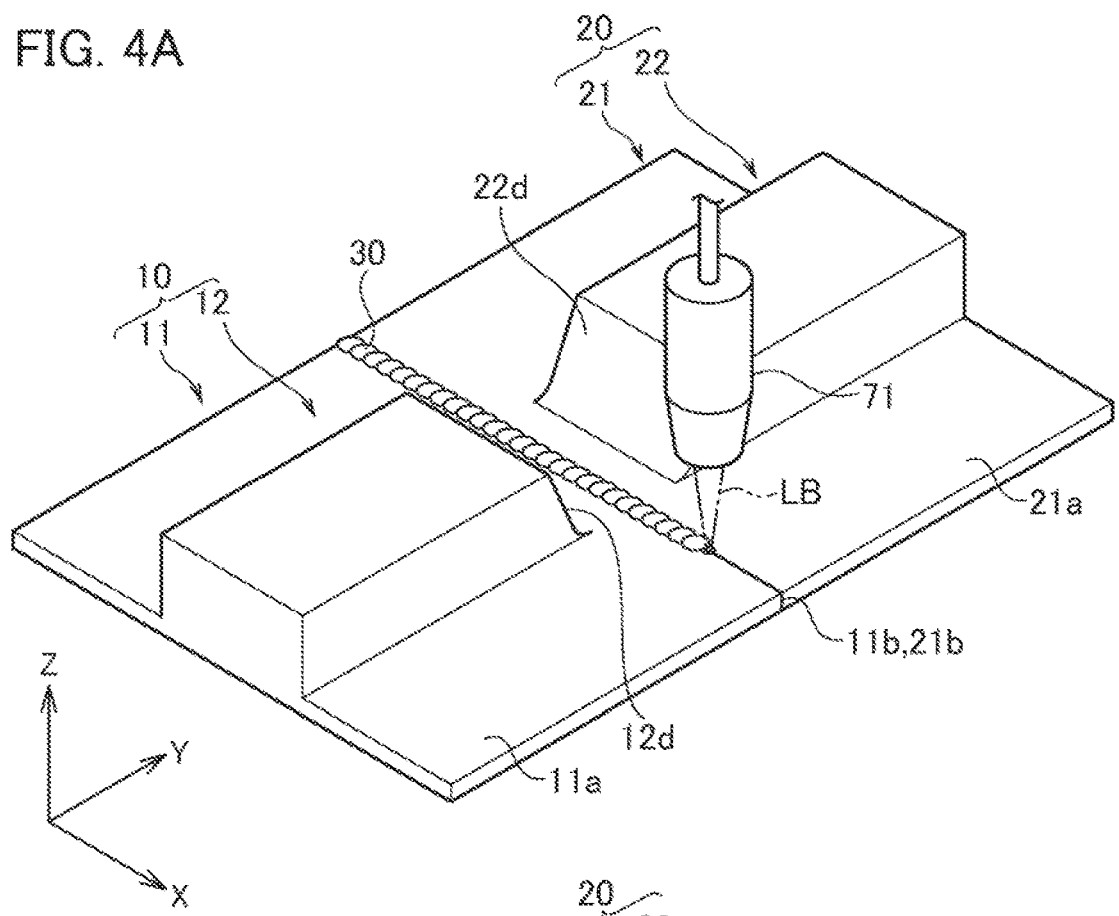
FIG. 4A is a view for explaining a substrate joint step in the joint method according to the first embodiment.
Figure 4B:
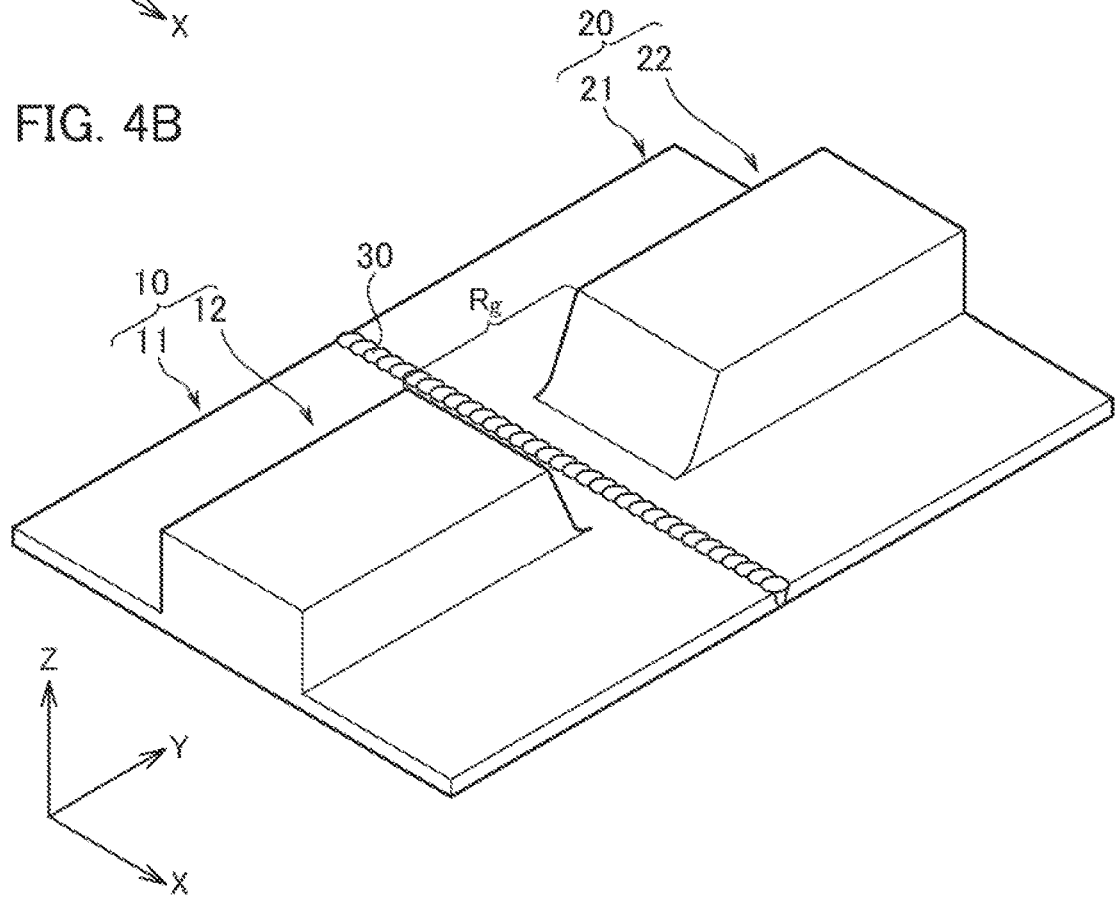
FIG. 4B is a view for explaining a substrate joint step in the joint method according to the first embodiment.

FIGS. 4A and 4B are views for explaining the substrate joint step S102. FIG. 4A is a perspective view showing a state during the execution of the substrate joint step S102. FIG. 4B is a perspective view showing a state after the completion of the substrate joint step S102.

The substrate joint step S102 is a step of connecting and joining the first substrate end surface 11b of the first substrate 11 and the second substrate end surface 21b of the second substrate 21 together by butt welding after the execution of the groove formation step S101. The present embodiment includes another welding step by buildup welding, which is a different welding mode other than the butt welding, in addition to the substrate joint step S102. The substrate welding step S102 is defined as a first welding step in the joint method according to the present embodiment so as to be distinguished from the other welding step executed afterward.

The substrate joint step S102 employs a welding device that can execute the butt welding. The welding device used for the welding in the substrate joint step S102 is referred to below as a first welding device so as to be distinguished from a welding device used for the welding in the other welding step. The first welding device is a laser welding device, for example.

Figure 5:
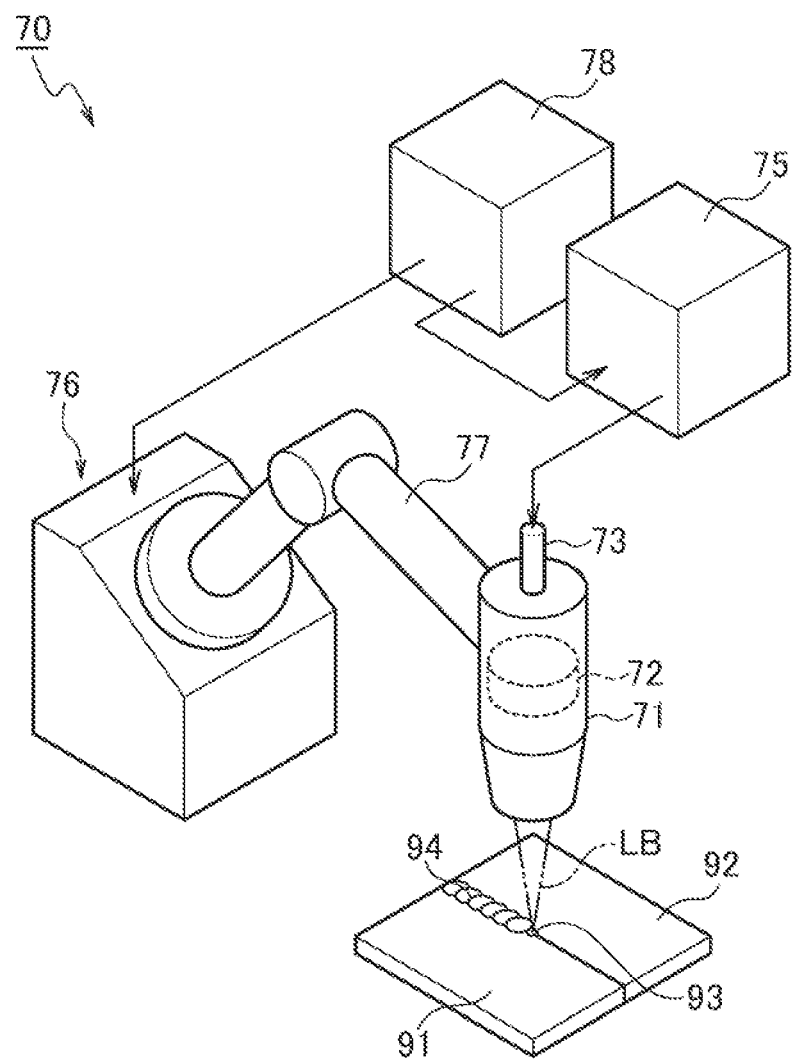
FIG. 5 is a view showing a laser welding device used in the substrate joint step.

FIG. 5 is a perspective view showing a configuration of a laser welding device 70 used for the welding in the substrate joint step S102. FIG. 5 illustrates a case in which a first metal plate 91 which is one of the joint targets and a second metal plate 92 which is the other joint target are joined to each other by the butt welding. The laser welding device 70 uses a laser beam LB as a heat source having high-density energy, and emits and concentrates the laser beam LB on an irradiation position 93 along the joint position to locally fuse and solidify the irradiation position 93, so as to join the first metal plate 91 and the second metal plate 92 to each other.

The laser welding device 70 includes a laser torch 71, a laser oscillator 75, a torch drive mechanism 76, and a controller 78. The laser oscillator 75 oscillates laser light in accordance with an oscillation instruction from the controller 78. The laser torch 71 houses a condensing optical system 72 therein. The laser torch 71 introduces the laser light oscillated from the laser oscillator 75 via an optical fiber 73, and causes the condensing optical system 72 to emit and focus the laser beam LB on the irradiation position 93. The torch drive mechanism 76 supports the laser torch 71 with a movable arm 77, and drives the arm 77 in accordance with a drive instruction from the controller 78 so as to change the position of the laser torch 71. The controller 78 causes the laser torch 71 to move on the irradiation position 93 along the joint position while emitting the laser beam LB, so as to join the first metal plate 91 and the second metal plate 92 to each other by the butt welding. The position at which the first metal plate 91 and the second metal plate 92 are joined together by the laser welding device 70 is provided with a welded part 94.

The welding conditions for the laser welding device 70 upon the butt welding, such as a welding speed and a laser output, can be changed depending on the size, the shape, or the material of the joint targets, for example, and may be determined as appropriate. A type of the laser used in the laser welding device 70 may also be determined as appropriate.

In the substrate joint step S102, the laser welding device 70 performs the butt welding on the position at which the first substrate end surface 11b and the second substrate end surface 21b are brought into contact with each other so as to gradually provide a welded part 30, as illustrated in FIG. 4A. The laser welding device 70 can finally join the first substrate 11 and the second substrate 21 to each other, as illustrated in FIG. 4B. The groove region $R_g$ still remains at this point immediately after the completion of the substrate joint step S102.

The first welding device is not limited to the laser welding device 70, and may be any device that can execute the butt welding for joining the first substrate 11 and the second substrate 21 to each other. The first welding device may be an electronic beam welding device using an electronic beam as a heat source classified as high-density energy as in the case of the laser beam, instead of the laser welding device using the laser beam as a heat source.

Figure 6:
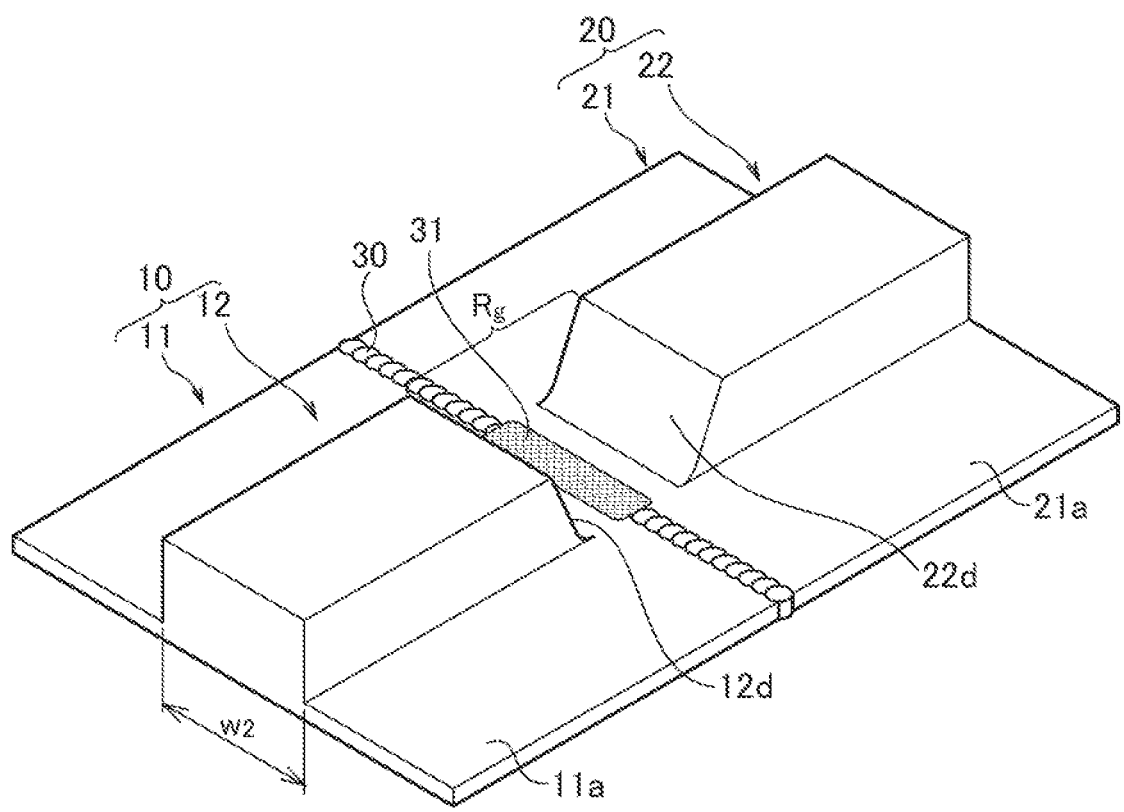
FIG. 6 is a view for explaining a base preparation step in the joint method according to the first embodiment.

FIG. 6 is a view for explaining the base preparation step S103.

The base preparation step S103 is a step of flattening unevenness caused at the welded part 30 formed in the substrate joint step S102 to prepare a base 31 corresponding to a part on which the welding is to be performed in the following buildup molding step S104. The part on which the welding is to be performed in the buildup molding step S104 is a part facing the groove region $R_g$. The base preparation step S103 flattens the unevenness caused at least at a part of the entire welded part 30 facing the groove region $R_g$, in other words, the unevenness caused in the welded part 30 corresponding to a part within the width $w_2$ of the first projection 12 and the second projection 22.

The base preparation step S103 may employ any method that can flatten the unevenness in the welded part 30. For example, the surface of the welded part 30 may be subjected to grinding or cutting processing by use of a typical grinding device or machine processing device, for example, so as to flatten the unevenness. The grinding device in this case may be operated automatically or may be operated manually by an operator.

The region provided with the base 31 prepared in the base preparation step S103 is not necessarily strictly limited to the corresponding part of the welded part 30, but may partly include the first plane surface 11a or the second plane surface 21a around the welded part 30.

In the joint method according to the present embodiment, the base preparation step S103 is not necessarily executed. For example, the base preparation step S103 may be eliminated when a level of the unevenness is not particularly high at the point of the substrate joint step S102 and the influence on the buildup welding in the buildup molding step S104 thus can be determined to be small.

Figure 7A:
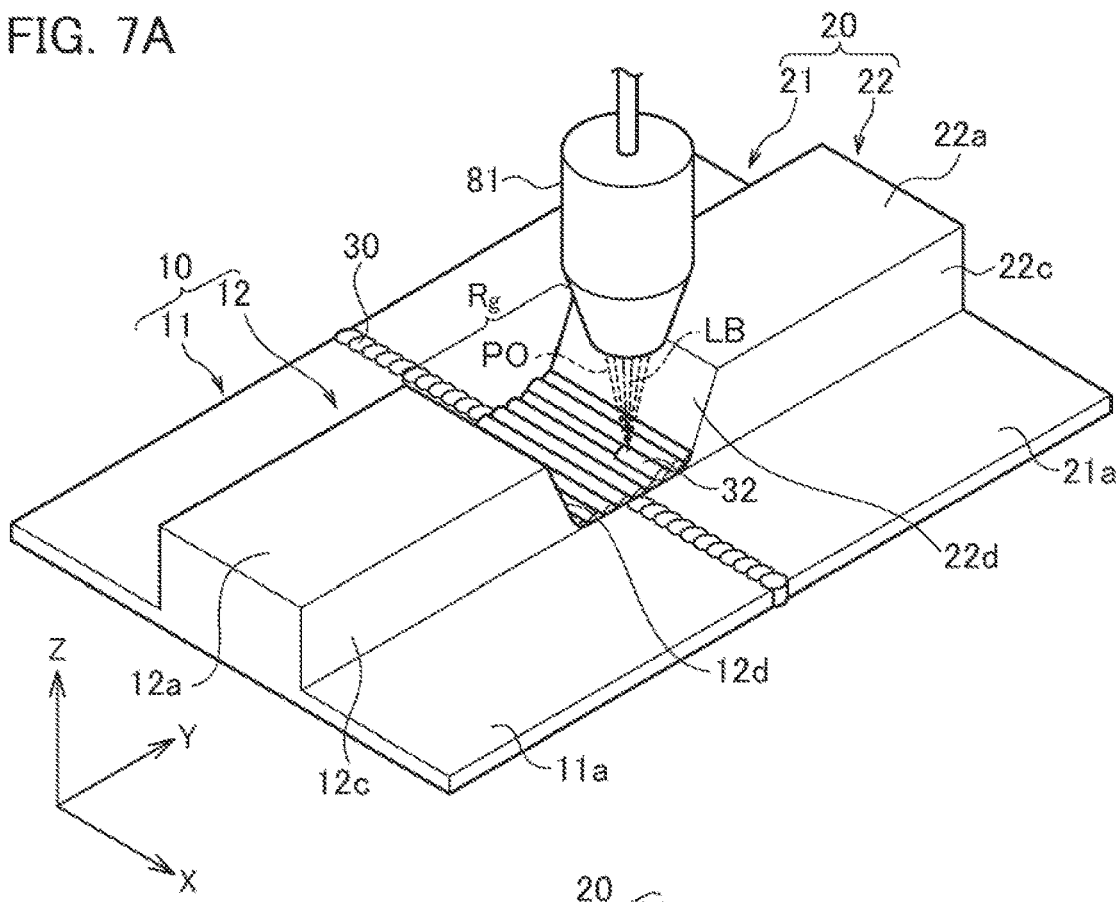
FIG. 7A is a view for explaining a buildup molding step in the joint method according to the first embodiment.
Figure 7B:
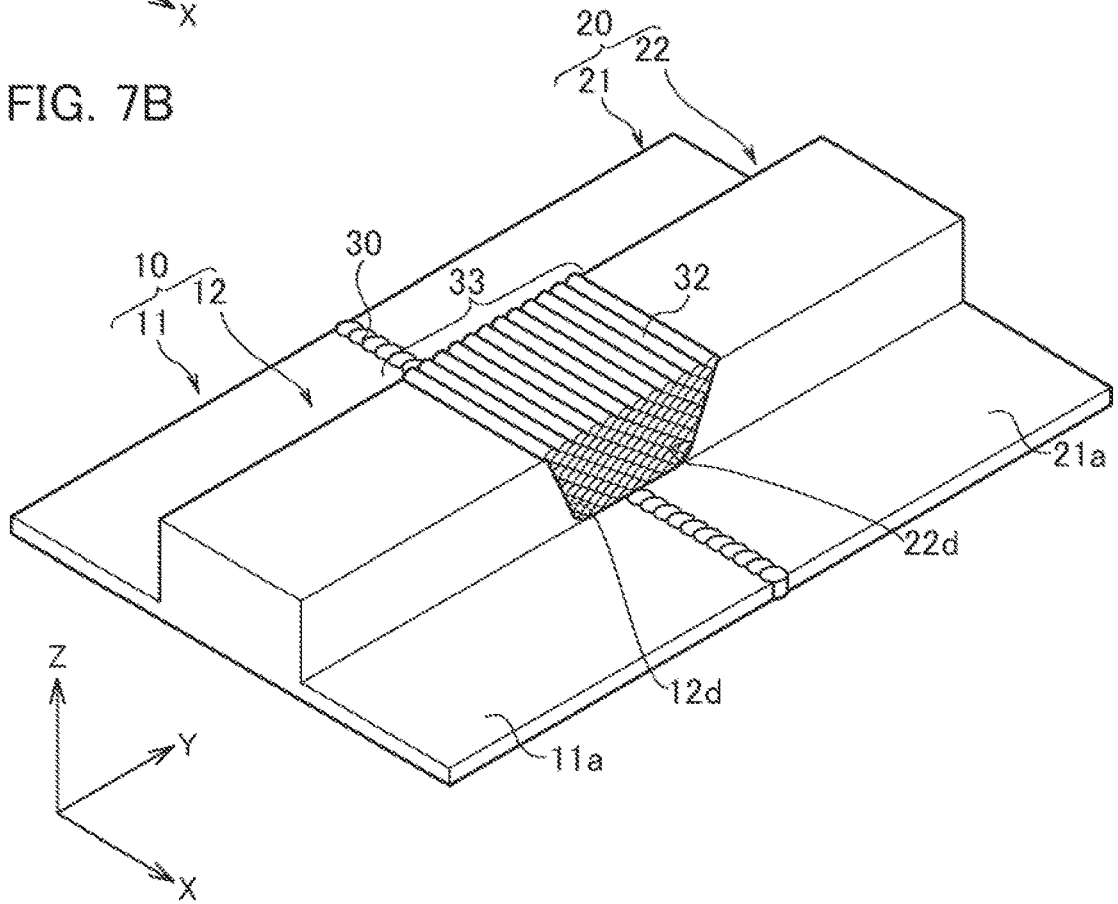
FIG. 7B is a view for explaining a buildup molding step in the joint method according to the first embodiment.

FIGS. 7A and 7B are views for explaining the buildup molding step S104. FIG. 7A is a perspective view showing a state during the execution of the buildup molding step S104. FIG. 7B is a perspective view showing a state after the completion of the buildup molding step S104.

The buildup molding step S104 is a step of filling the groove region $R_g$ by buildup welding after the execution of the base preparation step S103, or after the execution of the substrate joint step S102 in the case of eliminating the base preparation step S103. Since the present embodiment includes the substrate joint step S102 defined as the first welding step for executing the butt welding as described above, the buildup molding step S104 is defined as a second welding step in the joint method according to the present embodiment so as to be distinguished from the substrate joint step S102.

The buildup molding step S104 employs a welding device that can execute the buildup welding. The welding device used for the welding in the buildup molding step S104 is referred to below as a second welding device so as to be distinguished from the first welding device used for the butt welding in the substrate joint step S102. The second welding device is a metal deposition-type welding device employing a powder supply mode, for example.

Figure 8A:
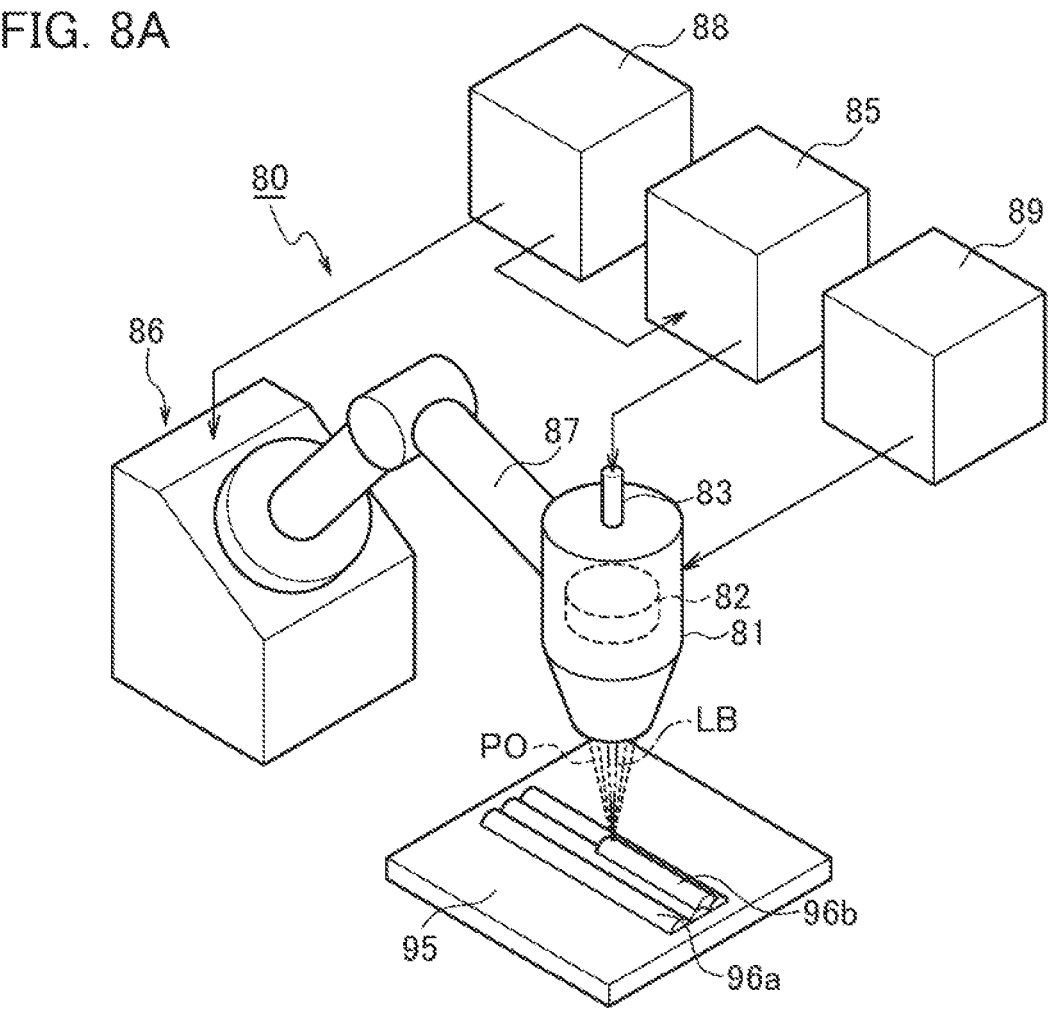
FIG. 8A is a perspective view showing a configuration of the metal deposition welding device.
Figure 8B:
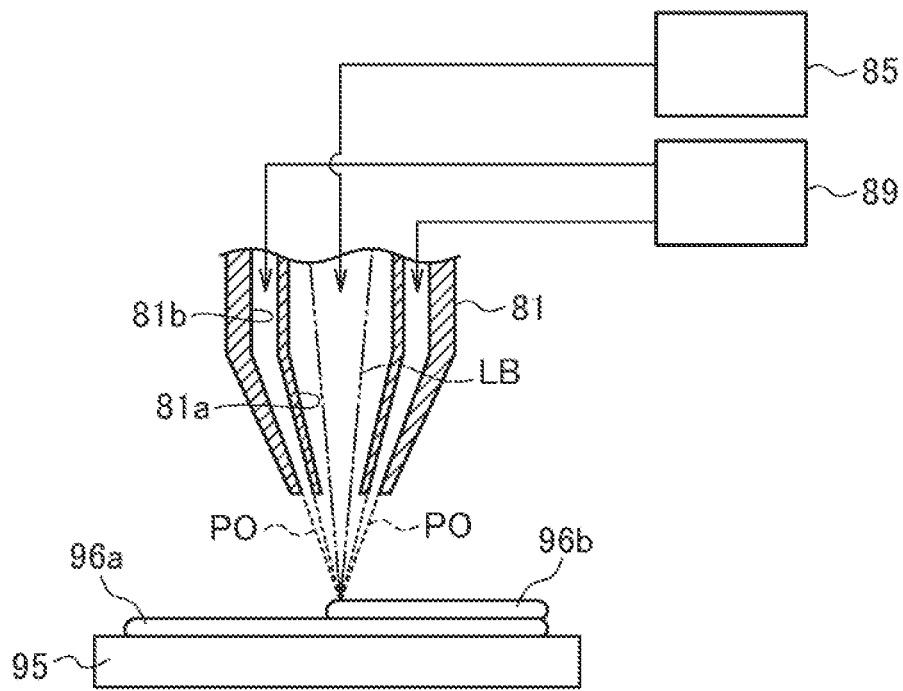
FIG. 8B is a partial cross-sectional view of a laser torch.

FIGS. 8A and 8B are views showing a metal deposition welding device 80 used for the welding in the buildup molding step S104. FIG. 8A is a perspective view showing a configuration of the metal deposition welding device 80. FIG. 8B is a partial cross-sectional view of a laser torch 81. FIGS. 8A and 8B illustrate a case in which the buildup welding is performed on a substrate 95. The metal deposition welding device 80 uses the laser beam LB as a heat source having high-density energy, as in the case of the laser welding device 70. The metal deposition welding device 80 sprays metal powder PO over a fusion area provided at the irradiation position while irradiating the irradiation position with the laser beam LB, so as to deposit the metal material to mold a continuous buildup portion 96.

The metal deposition welding device 80 includes a laser torch 81, a laser oscillator 85, a powder supply device 89, a torch drive mechanism 86, and a controller 88. The laser oscillator 85 oscillates laser light in accordance with an oscillation instruction from the controller 88. The laser torch 81 has two channels therein, which are a first channel 81*a* and a second channel 81*b*.

The first channel 81*a* is located on the inner side along the central axis of the laser torch 81, and includes a condensing optical system 82. The laser torch 81 introduces the laser light oscillated from the laser oscillator 85 to the first channel 81*a* via an optical fiber 83, and causes the condensing optical system 82 to emit and focus the laser beam LB on the irradiation position.

The second channel 81*b* is coaxially located on the outside of the first channel 81*a*. The second channel 81*b* is connected to the powder supply device 89 via a pipe. The powder supply device 89 uses carrier gas such as inert gas to supply the metal powder PO to the second channel 81*b*. The metal powder PO supplied to the second channel 81*b* is sprayed from the circumference of the laser beam LB toward the irradiation position of the laser beam LB, as illustrated in FIG. 8B. The torch drive mechanism 86 supports the laser torch 81 with a movable arm 87, and drives the arm 87 in accordance with a drive instruction from the controller 88 so as to change the position of the laser torch 81. The controller 88 causes the laser torch 81 to move along the irradiation position while emitting the laser beam LB and spraying the metal powder PO so as to form the buildup portion on the substrate 95. FIGS. 8A and 8B illustrate a case of forming a first layer 96*a* as a lowermost layer of the buildup portion on the surface of the substrate 95, and further forming a second layer 96*b* on the first layer 96*a*. The metal deposition welding device 80 repeats the continuous deposition molding as described above, so as to finally mold the buildup portion having an intended shape on the substrate 95.

The welding conditions for the metal deposition welding device 80 upon the buildup welding, such as a buildup speed and a laser output, can be changed depending on the size or the shape of the buildup portion, or the material of the metal powder PO, for example, and may be determined as appropriate. A type of the laser or a type of the metal powder PO used in the metal deposition welding device 80 may also be determined as appropriate. The metal powder PO used herein may be Ti-based (such as Ti-6Al-4V) or Ni-based (such as In718: Inconel 718 (registered trademark)) material.

In the buildup molding step S104, the metal deposition welding device 80 performs the buildup welding on the groove region $R_g$ to gradually deposit the buildup portion in the groove region $R_g$, as illustrated in FIG. 8A. The metal deposition welding device 80 finally fills the entire part of the groove region $R_g$ with the buildup portion 32 so as to mold the buildup part 33, as illustrated in FIG. 8B.

The second welding device is not limited to the metal deposition welding device 80 employing the powder supply mode, and may be any device that can execute the buildup welding for filling the groove region $R_g$. For example, a metal deposition welding device employing a wire supply mode that supplies metallic wire to the irradiation position of the laser beam LB may be used, instead of the powder supply mode. Particularly in the technical field of metal deposition welding devices capable of three-dimensional metal deposition manufacturing, the powder supply mode is referred to also as a powder feeding mode, and the wire supply mode is referred to also as a wire feeding mode. A supply speed during molding is not an essential element in the present disclosure and may be set optionally regardless of whether the powder supply mode or the wire supply mode is employed.

The foregoing groove formation step S101 is the step of forming the groove region $R_g$ as described above, while the distance $L_1$ and the inclination angle $\theta_1$ defining the shape of the groove region $R_g$ are determined in accordance with the shape of the laser torch 81 included in the metal deposition welding device 80. The possible dimensions regarding the distance $L_1$ and the inclination angle $\theta_1$ are described below with reference to FIG. 3B.

The laser torch 81 has a shape at a tip end part tapered off in the irradiation direction of the laser beam LB. In the drawing, an inclination angle of the outer wall composing the tip end part of the laser torch 81 to the central axis AX of the laser torch 81 is indicated by $\theta_2$. A length of the tip end part of the laser torch 81 in the axial direction is indicated by $L_2$, and a maximum diameter of the tip end part of the laser torch 81 is indicated by D. A distance from the laser torch 81 to the focus of the laser beam LB is indicated by $L_3$.

The inclination angle $\theta_1$ of the first inclined surface 12*d* and the inclination angle $\theta_1$ of the second inclined surface 22*d* are set to be equal to, or set to be greater than the inclination angle $\theta_2$ of the tip end part of the laser torch 81. For example, a case is herein presumed in which the inclination angle $\theta_2$ of the tip end part of the laser torch 81 is set to 30°, the length $L_2$ of the tip end part of the laser torch 81 in the axial direction is set to 50 mm, and the maximum diameter D of the tip end part of the laser torch 81 is set to 70 mm. The inclination angle $\theta_1$ of the first inclined surface 12*d* and the inclination angle $\theta_1$ of the second inclined surface 22*d* in this case are each set to 30°, or set to be greater than 30°. When the distance $L_3$ from the laser torch 81 to the focus of the laser beam LB is presumed to 13 mm, the joint method according to the present embodiment can be applied to a case in which a difference in the thickness $(t_2-t_1)$ at the joint position J in each of the first member 10 and the second member 20 can vary up to a value given by: the length $L_2$+the distance $L_3$=50 mm+13 mm=63 mm.

A gap between the first inclined surface 12*d* and the second inclined surface 22*d* is defined in a range in which the laser torch 81 emitting the laser beam LB is not brought into contact with the first inclined surface 12*d* or the second inclined surface 22*d*. When the inclination angle $\theta_1$ is presumed to be 0°, namely, when the first inclined surface 12*d* and the second inclined surface 22*d* are presumed to be orthogonal to the first plane surface 11*a* and the second plane surface 21*a*, a total value of the length $L_1$ toward the first member 10 and the length $L_1$ toward the second member 20 (2×$L_1$) needs to be greater than the maximum diameter D of the tip end part of the laser torch 81 so as to keep the distance $L_3$ from the laser torch 81 to the focus of the laser beam LB to be 13 mm. If not, the laser torch 81 would be brought into contact with the first inclined surface 12*d* or the second inclined surface 22*d* particularly when the buildup welding is performed on a region adjacent to the first inclined surface 12*d* or the second inclined surface 22*d* in the groove region $R_g$.

Figure 9:
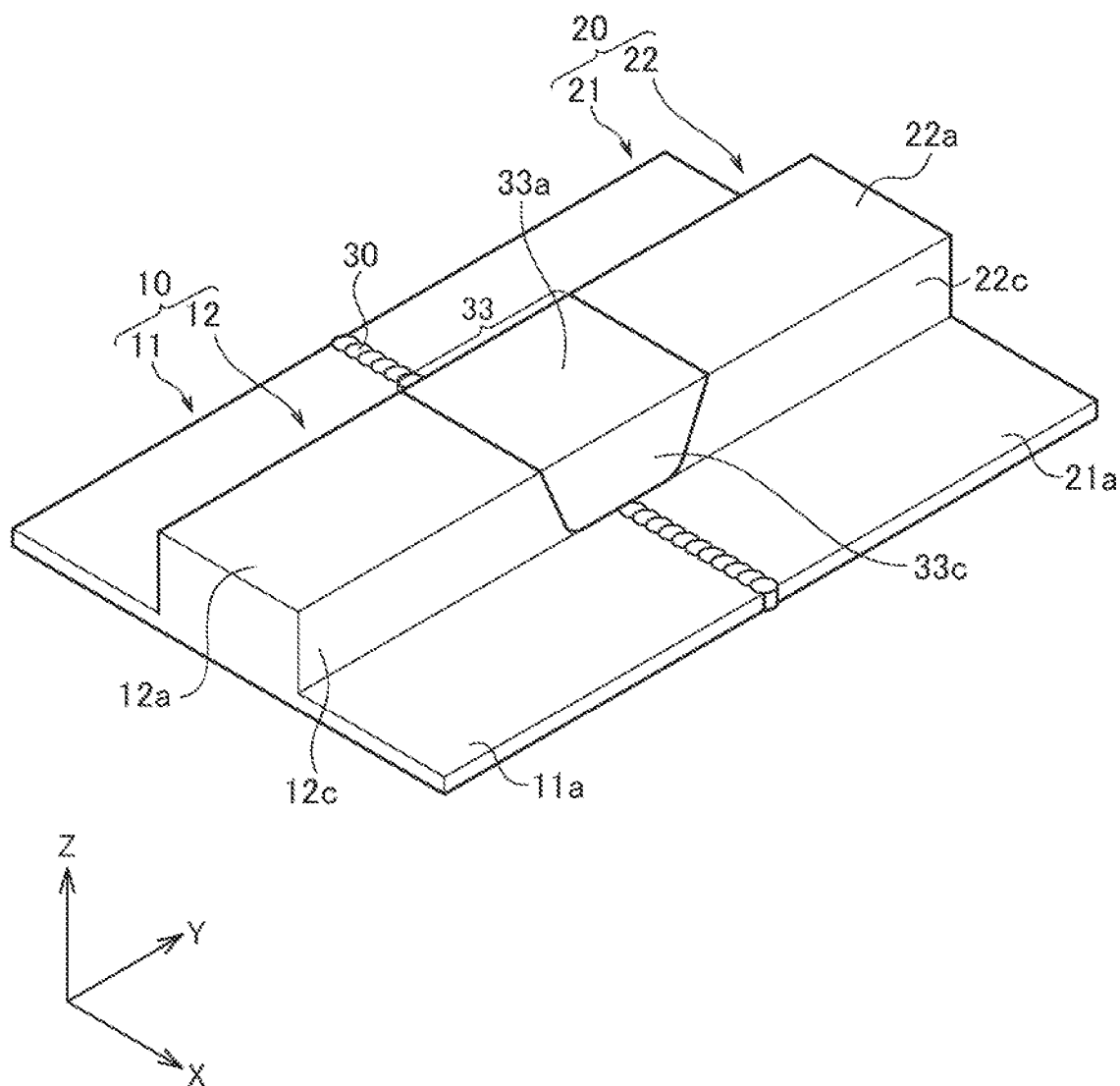
FIG. 9 is a view for explaining a buildup surface finishing step in the joint method according to the first embodiment.

FIG. 9 is a view for explaining the buildup surface finishing step S105.

The buildup surface finishing step S105 is a step of finishing the surface of the buildup part 33 filled and molded in the groove region $R_g$ in the buildup molding step S104. Since the buildup part 33 is molded to fill the groove region $R_g$, the buildup surface exposed to the outside on the buildup part 33 includes a top surface 33*a* and two side surfaces 33*c*. The top surface 33*a* is a surface connected to a first top surface 12*a* of the first projection 12 and a second top surface 22*a* of the second projection 22. The respective side surfaces 33c are surfaces connected to first projection side surfaces 12c of the first projection 12 and second projection side surfaces 22c of the second projection 22. The buildup surface finishing step S105 may first finish the top surface 33a so as to be smoothly connected to the first top surface 12a and the second top surface 22a. The buildup surface finishing step S105 may then finish the two side surfaces 33c so as to be smoothly connected to the respective first projection side surfaces 12c and the respective second projection side surfaces 22c.

The buildup surface finishing step S105 may employ any method that can finish the surface of the buildup part 33. For example, the surface of the buildup part 33 may be subjected to grinding or cutting processing by use of a typical grinding device or machine processing device so as to be finished, for example. The grinding device particularly in this case may be operated automatically or may be operated manually by an operator.

The region of the surface to be finished in the buildup surface finishing step S105 is not necessarily strictly limited to the surface of the buildup part 33, but may partly include the first top surface 12a or the second top surface 22a, or the respective first projection side surfaces 12c or the respective second projection side surfaces 22c around the buildup part 33.

In the joint method according to the present embodiment, the buildup surface finishing step S105 is not necessarily executed. For example, the buildup surface finishing step S105 may be eliminated when the buildup part 33 does not have large unevenness at the point of the completion of the buildup molding step S104, or when a product obtained by joining the first member 10 and the second member 20 together does not need to have good appearance.

Next, the effects of the joint method according to the present embodiment are described below.

The joint method according to the present embodiment first brings the first member 10 including the first substrate 11 and the first projection 12 projecting from the first substrate 11 into contact with the second member 20 including the second substrate 21 and the second projection 22 projecting from the second substrate 21 so as to be joined together. The joint method includes the groove formation step S101 of removing part of the first projection 12 opposed to the second projection 22 and part of the second projection 22 opposed to the first projection 12 to form the groove region $R_g$ between the first projection 12 and the second projection 22. The joint method also includes the substrate joint step S102 that is the first welding step of joining the first member 10 and the second member 20 to each other by the butt welding after the groove formation step S101. The joint method also includes the buildup molding step S104 that is the second welding step of filling the groove region $R_g$ by the buildup welding after the first welding step. The groove formation step S101 forms the first inclined surface 12d in the first projection 12 facing the groove region $R_g$ to be gradually distant from the joint position J joined with the second projection 22 so as to be closer to the outer surface of the first projection 12. The groove formation step S101 also forms the second inclined surface 22d in the second projection 22 facing the groove region $R_g$ to be gradually distant from the joint position J joined with the first projection 12 so as to be closer to the outer surface of the second projection 22.

The first member 10 and the second member 20 as the joint targets each have the different thicknesses at the joint position J. In particular, the thickness $t_1$ at the part corresponding to the first substrate 11 differs from the thickness $t_2$ at the part corresponding to the first projection 12 at the joint position J in the first member 10. Similarly, the thickness $t_1$ at the part corresponding to the second substrate 21 differs from the thickness $t_2$ at the part corresponding to the second projection 22 at the joint position J in the second member 20. The joint method, when joining the members each having the thickness varying depending on the parts at the joint position J, uses the different kinds of welding between the case of joining the region including the first substrate 11 and the second substrate 21 and the case of joining the region including the first projection 12 and the second projection 22.

As a comparative example, a case is presumed that the joint between the first substrate 11 and the second substrate 21 and the joint between the first projection 12 and the second projection 22 are continuously made by the same welding method, such as the butt welding. This comparative case needs to change the welding conditions upon the welding between the joint between the first substrate 11 and the second substrate 21 and the joint between the first projection 12 and the second projection 22. The change of the welding conditions sometimes would not be possible depending on the difference in the thickness $(t_2-t_1)$ at the joint position J or the shape of the joint surface. For example, a case is presumed in which the joint between the first substrate 11 and the second substrate 21 and the joint between the first projection 12 and the second projection 22 are made only by the butt welding by use of the laser welding device 70 as illustrated above. When the laser oscillator 75 is operated with the maximum output of 7 kW, the maximum value of the difference in the thickness $(t_2-t_1)$ at the joint position J presumed to actually be able to be welded is in a range of 10 to 15 mm. In other words, it is difficult to join the first member 10 and the second member 20 to each other only by the butt welding when the difference in the thickness $(t_2-t_1)$ is 10 to 15 mm or greater.

In contrast, according to the present embodiment, the welding conditions do not need to be changed complicatedly in the same welding step, since the type of welding is changed depending on the parts having different thicknesses at the joint position J. The thickness $t_2$ of the part corresponding to each of the first projection 12 and the second projection 22 is greater than the thickness $t_1$ of the part corresponding to each of the first substrate 11 and the second substrate 21. The present embodiment executes the joint by the buildup welding between the first projection 12 and the second projection 22 each having the greater thickness $t_2$, so as to expand the possibility of the shape of the parts to be joined together, as compared with the conventional case, regardless of whether the difference in the thickness $(t_2-t_1)$ at the joint position J is relatively large.

A typical welding device, when executing buildup welding, usually partly comes close to a position at which a buildup part is molded. According to the present embodiment, since the groove region $R_g$ is formed before the execution of the respective welding steps, a part of the welding device is located within the groove region $R_g$. This can preliminarily avoid the interference of the welding device with the joint targets.

As described above, the present embodiment can provide the joint method having the advantage of expanding the application range of the case upon joining the members each having the thickness that varies depending on the parts at the joint position J. The phrase "expanding the application range" as used herein means that the present embodiment can join the joint targets that are hard to join by a conventional joint method, for example, so as to increase the possibility of types of joint targets to which the joint method according to the present embodiment can be applied.

In the joint method according to the present embodiment, the first inclined surface 12d may be a surface gradually distant from the joint position J joined with the second projection 22 as the first inclined surface 12d is separate from the first substrate 11. Similarly, the second inclined surface 22d may be a surface gradually distant from the joint position J joined with the second projection 22 as the second inclined surface 22d is separate from the second substrate 21.

The first inclined surface 12d is gradually distant from the joint position J joined with the second projection 22 as the first inclined surface 12d is closer to the outer surface of the first projection 12, as described above. The outer surface of the first projection 12 in this case corresponds to the first top surface 12a. Similarly, the second inclined surface 22d is gradually distant from the joint position J joined with the first projection 12 as the second inclined surface 22d is closer to the outer surface of the second projection 22, as described above. The outer surface of the second projection 22 in this case corresponds to the second top surface 22a.

A typical welding device that executes buildup welding includes a part that has a tapered shape toward a buildup part to be molded and comes closest to the buildup part during welding. According to the present embodiment, the groove region $R_g$ is a region in which the first inclined surface 12d and the second inclined surface 22d are opposed to each other, so as to further avoid the interference of the welding device with the joint targets during the welding.

The joint method according to the present embodiment may execute the butt welding by use of the first welding device using the high-density energy as a heat source. The first welding device used herein is the laser welding device 70, for example.

The joint method as described above can immediately join the area including the first substrate 11 and the second substrate 21 by the butt welding. Since the first substrate 11 and the second substrate 21 each particularly have a relatively thin thickness at the joint position J and thus reduce the limitation on the thickness at the joint position J, the first welding device is effective for the use in the first welding step.

The joint method according to the present embodiment may execute the buildup welding by use of the metal deposition-type second welding device using the laser beam LB as a heat source. The second welding device used herein is the metal deposition welding device 80, for example.

The second welding device used in the joint method as described above gradually deposits the buildup part in the thickness direction, so as to fill the entire groove region $R_g$ regardless of whether the difference in the thickness $(t_2-t_1)$ at the joint position J is relatively large.

The second welding device used in the joint method according to the present embodiment includes the laser torch 81 that emits the laser beam LB. In this case, the inclination angle $\theta_1$ of the first inclined surface 12d with respect to the projecting direction of the first projection 12 and the inclination angle $\theta_1$ of the second inclined surface 22d with respect to the projecting direction of the second projection 22 may each be equal to the inclination angle $\theta_2$ of the outer wall composing the tip end part of the laser torch 81. The inclination angle $\theta_1$ of the first inclined surface 12d and the inclination angle $\theta_1$ of the second inclined surface 22d may each be greater than the inclination angle $\theta_2$ instead. The gap between the first inclined surface 12d and the second inclined surface 22d may be determined such that the laser torch 81 emitting the laser beam LB is not brought into contact with the first inclined surface 12d or the second inclined surface 22d.

According to the joint method as described above, the distance $L_1$ and the inclination angle $\theta_1$ defining the shape of the groove region $R_g$ are determined in accordance with the shape of the laser torch 81 included in the second welding device. This can further avoid the interference of the second welding device with the first projection 12 or the second projection 22 during the welding.

In the joint method according to the present embodiment, the first inclined surface 12d may be continuously connected to the first plane surface 11a that is the surface of the first substrate 11 via the first curved surface 12e. Similarly, the second inclined surface 22d may be continuously connected to the second plane surface 21a that is the surface of the second substrate 21 via the second curved surface 22e.

The joint method as described above can avoid fusion failure at the boundary between the first inclined surface 12d and the first substrate 11 or the boundary between the second inclined surface 22d and the second substrate 21 upon the execution of the buildup welding in the second welding step.

The dimensions at the respective parts regarding the laser torch 81 are herein presumed to have the respective values as illustrated in the above explanations regarding the metal deposition welding device 80. In this case, the value of the radius of curvature R of each of the first curved surface 12e and the second curved surface 22e may be set in a range of 1 to 5 mm, for example, so as to avoid the fusion failure.

The joint method according to the present embodiment may further include the base preparation step S103, before the second welding step, for flattening the unevenness caused at the welded part 30 welded in the first welding step to prepare the base 31 corresponding to the part to be welded in the second welding step.

The joint method as described above prepares the base 31 before the second welding step at the part on which the buildup welding is to be performed in the second welding step, so as to improve the fusion performance at the buildup part particularly with respect to the first plane surface 11a or the second plane surface 21a.

The joint method according to the present embodiment may further include the buildup surface finishing step S105, after the second welding step, for finishing the surface of the buildup part 33 filled and molded in the groove region $R_g$ in the second welding step.

The joint method thus can enhance the good appearance of the buildup part 33.

Other Joint Targets

The joint method according to the present embodiment is illustrated above with the first member 10 and the second member 20 as the joint targets. The first substrate 11 and the first projection 12 composing the first member 10 or the second substrate 21 and the second projection 22 composing the second member 20 may have any types of shape other than that illustrated in the respective drawings. For example, the first projection 12 or the second projection 22 does not necessarily have a cuboid shape, and may have a trapezoidal shape, for example.

FIGS. 10A and 10B are side view showing, as another shape of the joint targets, the first member 10 in a case in which the first projection 12 has a trapezoidal shape. FIGS. 10A and 10B show the side surface of the first member 10 as viewed in the Y direction. The second member 20 in this case may have the same shape as the first member 10 illustrated in FIGS. 10A and 10B.

FIG. 10A illustrates the first member 10 in a case in which a width $w_{21}$ at the upper base corresponding to the first top surface 12a in the first projection 12 is smaller than a width $w_{22}$ at the lower base. An angle $\theta_3$ of the respective first projection side surfaces 12c to the first plane surface 11a in this case is an obtuse angle. FIG. 10B illustrates the first member 10 in a case in which the width $w_{21}$ at the upper base corresponding to the first top surface 12a in the first projection 12 is greater than the width $w_{22}$ at the lower base. An angle $\theta_4$ of the respective first projection side surfaces 12c to the first plane surface 11a in this case is an acute angle.

In the case in which the first projection 12 and the second projection 22 each have the shape as illustrated in FIG. 10A, the first member 10 and the second member 20 can be joined to each other by use of the joint method according to the present embodiment. The joint method according to the present embodiment can be applied to the case in which the difference in the thickness $(t_2-t_1)$ at the joint position J is relatively small. In addition, the first member 10 and the second member in such a case may be joined together at once only by the butt welding, for example.

The joint method according to the present embodiment can join the first member 10 and the second member 20 to each other also in the case in which the first projection 12 and the second projection 22 each have the shape as illustrated in FIG. 10B. The present embodiment joins the first projection 12 and the second projection 22 to each other by the buildup welding, and thus can be applied to the case in which the respective first projection side surfaces 12c have the angle to be inclined over the first plane surface 11a. In contrast to the present embodiment, in a case of using a joint method that joins the first member 10 and the second member 20 to each other at once only by the butt welding, it is difficult to join the first projection 12 and the second projection 22 to each other when the first projection 12 has the first projection side surfaces 12c each having the angle to be inclined over the first plane surface 11a. The joint method according to the present embodiment can be effectively applied particularly to the case of joining the first member 10 and the second member 20 to each other having the shape as illustrated in FIG. 10B.

Second Embodiment

The groove formation step S101 removes part of the first projection 12 and part of the second projection 22. The first embodiment is illustrated above with the case in which the groove region $R_g$ is formed such that the first inclined surface 12d is gradually distant from the joint position J joined with the second projection 22 as the first inclined surface 12d is separate from the first substrate 11, as illustrated in FIG. 3A. The same is also applied to the case of the second inclined surface 22d. A second embodiment differs from the first embodiment in the shape of the groove region $R_g$ formed in the groove formation step S101. The process of the joint method according to the present embodiment is similar to the process shown in the flowchart in FIG. 2 as described in the first embodiment. The joint method according to the present embodiment is also described with reference to the flowchart shown in FIG. 2.

Figure 11:
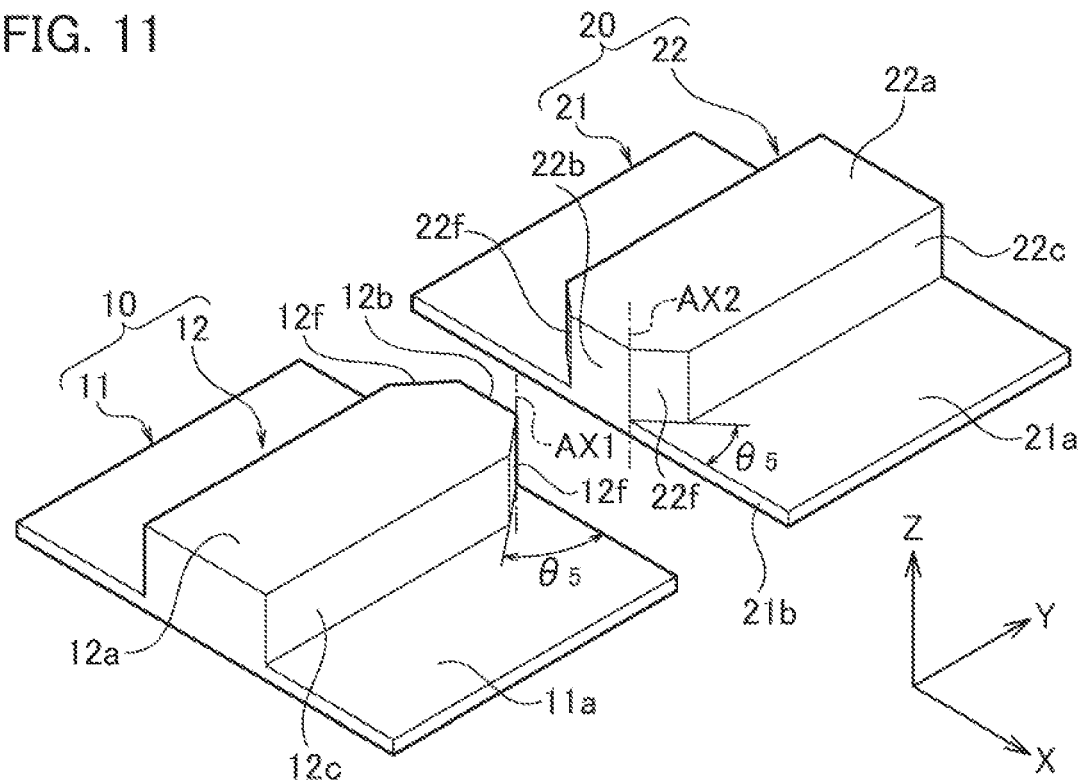
FIG. 11 is a view showing a state of joint targets after executing a groove formation step in a joint method according to a second embodiment.

FIG. 11 is a perspective view showing a state of the first member 10 and the second member 20 after the groove formation step S101 is executed in the second embodiment. In the present embodiment, there are two groove regions of a first groove region $R_{g1}$ and a second groove region $R_{g2}$ formed such that the respective first projection side surfaces 12c and the respective projection side surfaces 22c are cut off (refer to FIG. 12). To form the first groove region $R_{g1}$ and the second groove region $R_{g2}$, two first inclined surfaces 12f and two second inclined surfaces 22f in the present embodiment are configured as described below.

The two first inclined surfaces 12f in the first member 10 are each defined as a surface inclined to a joint surface perpendicular to a joint direction between the first projection 12 and the second projection 22 on the basis of a first axis AX1 intersecting the surface of the first substrate 11. The joint direction herein corresponds to the Y direction in the drawing. The joint surface herein corresponds to the X-Z plane surface at the joint position J as illustrated above.

FIG. 11 illustrates a case in which the first axis AX1 is perpendicular to the surface of the first substrate 11. The respective first inclined surfaces 12f are inclined to the joint surface at an inclination angle $\theta_5$ about the first axis AX1. As defined above, since the respective first inclined surfaces 12f are gradually distant from the joint position joined with the second projection 22 as the respective first inclined surfaces 12f are closer to the outer surface of the first projection 12, the respective first inclined surfaces 12f are directed diagonally to the outside of the first projection 12, as illustrated in FIG. 11. The outer surface of the first projection 12 in this case corresponds to the respective first projection side surfaces 12c.

Similarly, the two second inclined surfaces 22f in the second member 20 are each defined as a surface inclined to the joint surface perpendicular to the joint direction between the first projection 12 and the second projection 22 on the basis of a second axis AX2 intersecting the surface of the second substrate 21.

FIG. 11 illustrates a case in which the second axis AX2 is perpendicular to the surface of the second substrate 21. The respective second inclined surfaces 22f are inclined to the joint surface at the inclination angle $\theta_5$ about the second axis AX2. As defined above, since the respective second inclined surfaces 22f are gradually distant from the joint position joined with the first projection 12 as the respective second inclined surfaces 22f are closer to the outer surface of the second projection 22, the respective second inclined surfaces 22f are directed diagonally to the outside of the second projection 22, as illustrated in FIG. 11. The outer surface of the second projection 22 in this case corresponds to the respective second projection side surfaces 22c.

Namely, in the present embodiment, the part removed from the first projection 12 makes a substantially symmetrical shape with the part removed from the second projection 22 about the joint position J. The combination of the part removed from the first projection 12 along one of the first inclined surfaces 12f and the part removed from the second projection 22 along one of the second inclined surfaces 22f defines the first groove region $R_{g1}$. Similarly, the other combination of the part removed from the first projection 12 along the other first inclined surface 12f and the part removed from the second projection 22 along the other second inclined surface 22f defines the second groove region $R_{g2}$.

In the case illustrated in FIG. 11, the groove formation step S101 leaves a part of the first projection end surface 12b between the two first inclined surfaces 12f, and leaves a part of the second projection end surface 22b between the two second inclined surfaces 22f. The remaining first projection end surface 12b and the remaining the second projection end surface 22b are opposed and close to each other.

While FIG. 11 illustrates the case in which the first axis AX1 and the second axis AX2 are perpendicular to the respective surfaces of the first substrate 11 and the second substrate 21, the first axis AX1 and the second axis AX2 are not necessarily perpendicular to the respective surfaces. While FIG. 11 illustrates the case in which the inclination angle of each of the first inclined surfaces 12f and the second inclined surfaces 22f is the same inclined angle $\theta_5$, the inclined angle may differ from each other. While FIG. 11 illustrates the case in which the two first inclined surfaces 12f provided in the first projection 12 and the two second inclined surfaces 22f provided in the second projection 22 are the same, the respective inclined surfaces may differ from each other. While FIG. 11 illustrates the case in which the respective first inclined surfaces 12f and the respective second inclined surfaces 22f are the flat surfaces, the respective inclined surfaces may be entirely or partly curved.

Figure 12:
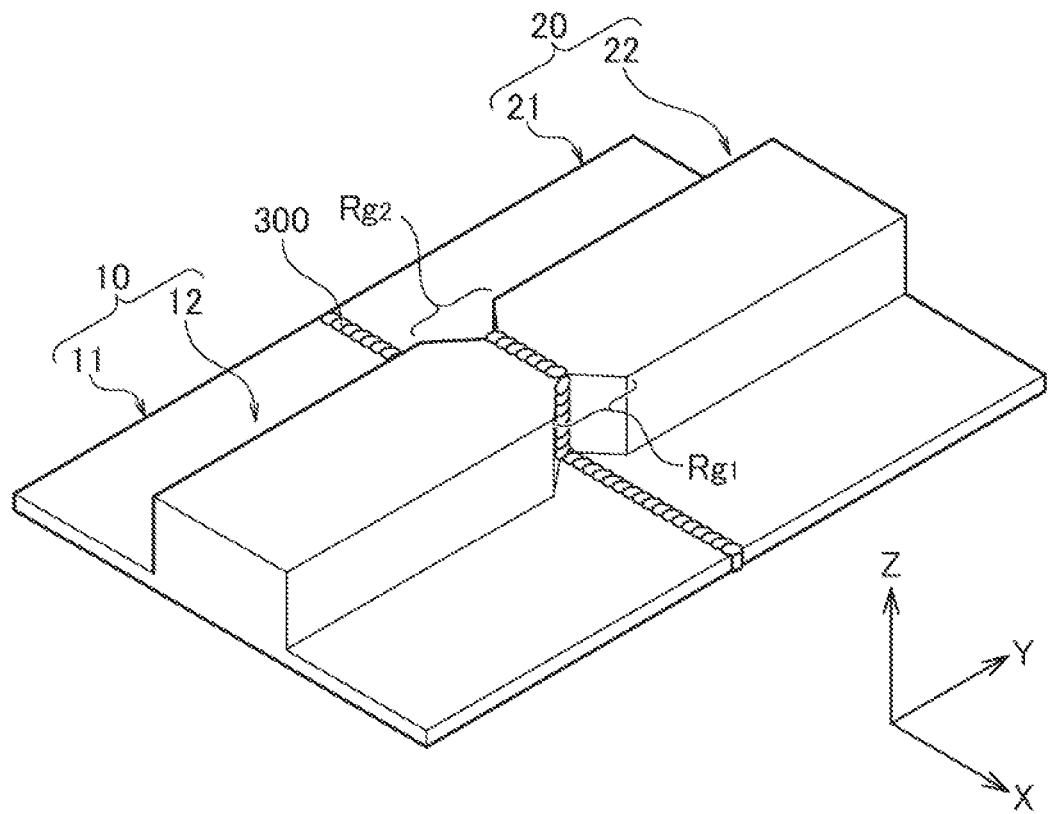
FIG. 12 is a view showing a state of the joint targets after executing a substrate joint step in the joint method according to the second embodiment.

FIG. 12 is a perspective view showing a state of the first member 10 and the second member 20 after the substrate joint step S102 is executed in the second embodiment. The present embodiment also joins the first substrate end surface 11b of the first substrate 11 and the second substrate end surface 21b of the second substrate 21 to each other by the butt welding by use of the first welding device that is the laser welding device 70, for example. In the present embodiment, a part of the first projection end surface 12b and a part of the second projection end surface 22b are close to each other at the joint position J. The substrate joint step S102 according to the present embodiment thus joins a part of the first projection end surface 12b and a part of the second projection end surface 22b continuously in association with a part of the first substrate end surface 11b of the first substrate 11 and a part of the second substrate end surface 21b of the second substrate 21 by the butt welding.

In the substrate joint step S102, the laser welding device 70 first executes the butt welding while positioning the first substrate end surface 11b and the second substrate end surface 21b at the contact position, and gradually forms a welded part 300. The welded part 300 is gradually provided from the second groove region $R_{g2}$ side to reach the region in which the first projection end surface 12b and the second projection end surface 22b are close to each other as the butt welding advances. The laser welding device 70 then continuously joins the first inclined surface 12f and the second inclined surface 22f in the second groove region $R_{g2}$, the first top surface 12a and the second top surface 22a outside the groove region, and the first inclined surface 12f and the second inclined surface 22f in the first groove region $R_{g1}$. The laser welding device 70 keeps joining the remaining first substrate end surface 11b and the remaining second substrate end surface 21b along the joint position J. The laser welding device 70 can finally join the first projection 12 and the second projection 22 to each other in addition to the first substrate 11 and the second substrate 21, as illustrated in FIG. 12. The first groove region $R_{g1}$ and the second groove region $R_{g2}$ still remain at this point immediately after the completion of the substrate joint step S102.

In the substrate joint step S102 according to the present embodiment, the welding direction, namely, the advancing direction of the welded part 300 changes during the continuous butt welding. In the case in which the welding direction changes, the attitude of the laser welding device 70 with respect to the first member 10 and the second member 20 may be changed as necessary, or the attitude of the first member 10 and the second member 20 with respect to the laser welding device 70 may be changed as necessary.

Figure 13:
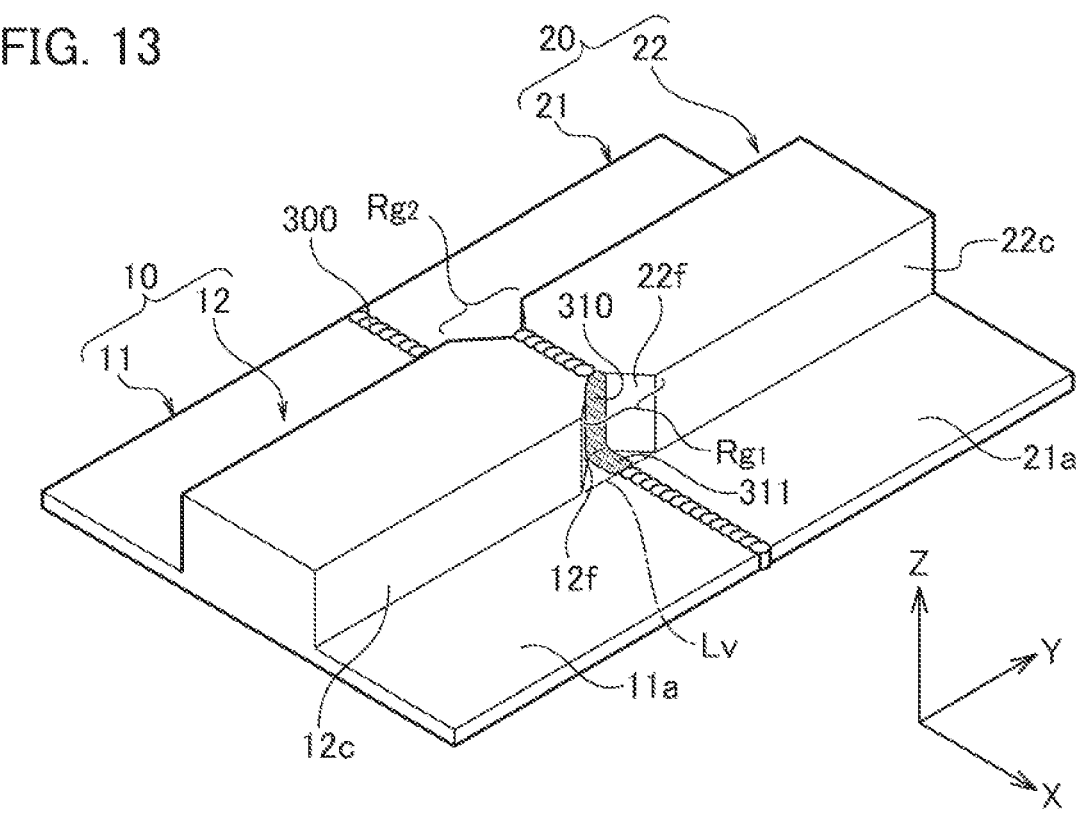
FIG. 13 is a view showing a state of the joint targets after executing a base preparation step in the joint method according to the second embodiment.

FIG. 13 is a perspective view showing a state of the first member 10 and the second member 20 after the base preparation step S103 is executed in the second embodiment. In the present embodiment, the part in which the welding is to be performed in the following buildup molding step S104 corresponds to the part facing the first groove region $R_{g1}$ and the part facing the second groove region $R_{g2}$. The base preparation step S103 thus flattens the unevenness caused at least at the part facing the first groove region $R_{g1}$ and the part facing the second groove region $R_{g2}$ in the entire welded part 300. In particular, two bases of a first base 310 and a second base 311 are prepared in the first groove region $R_{g1}$, for example. The first base 310 is a part at which the unevenness is flattened in the welded part 300 joining the first inclined surface 12f and the second inclined surface 22f in the first groove region $R_{g1}$. When the first projection side surface 12c and the second projection side surface 22c are presumed to be connected via a virtual line Lv on the first plane surface 11a or the second plane surface 21a, the second base 311 corresponds to a part at which the unevenness is flattened on the inner side of the virtual line Lv in the first groove region $R_{g1}$ in the welded part 300 on the first plane surface 11a or the second plane surface 21a. The first base 310 or the second base 311 is not necessarily strictly limited to the corresponding part of the welded part 300, and may include part of the first inclined surface 12f or the second inclined surface 22f or part of the first plane surface 11a or the second plane surface 21a around the welded part 300. In the joint method according to the present embodiment, the base preparation step S103 is not necessarily executed, as in the case of the first embodiment.

Figure 14:
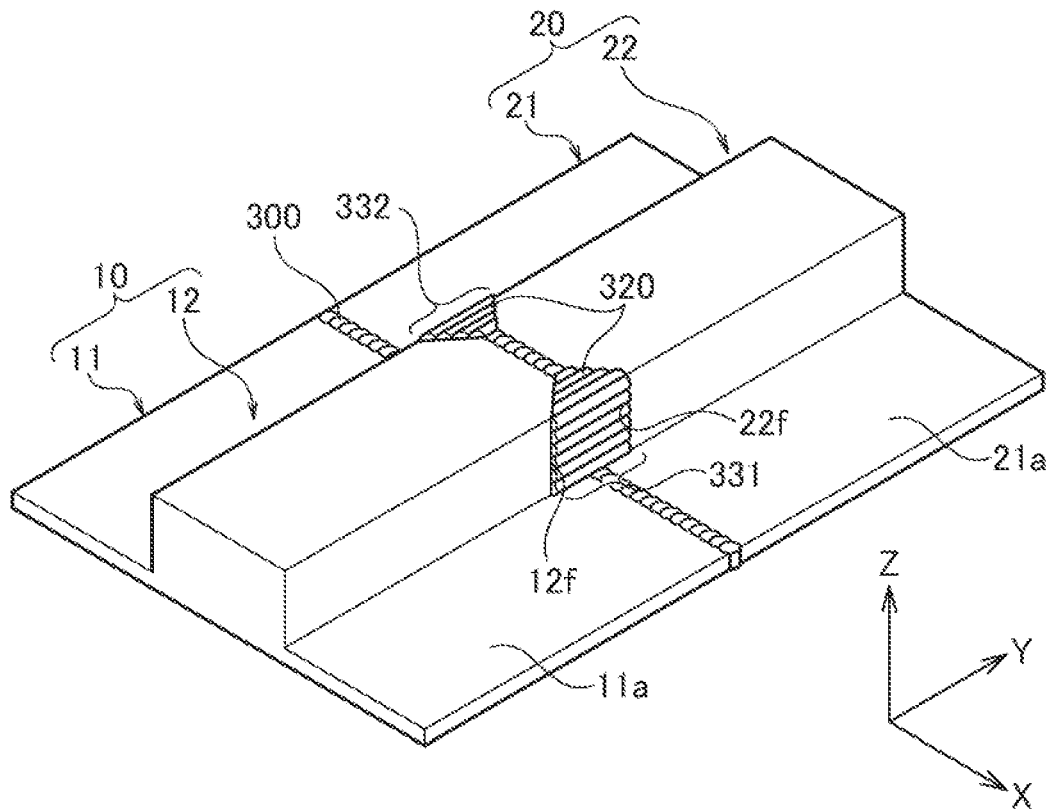
FIG. 14 is a view showing a state of the joint targets after executing a buildup molding step in the joint method according to the second embodiment.

FIG. 14 is a perspective view showing a state of the first member 10 and the second member 20 after the buildup molding step S104 is executed in the second embodiment. The present embodiment also gradually deposits a buildup part 320 in each of the first groove region $R_{g1}$ and the second groove region $R_{g2}$ by the buildup welding by use of the second welding device that is the metal deposition welding device 80, for example. The metal deposition welding device 80 fills the entire area of the first groove region $R_{g1}$ with the buildup part 320 so as to finally mold a first buildup part 331, as illustrated in FIG. 14. The metal deposition welding device 80 also fills the entire area of the second groove region $R_{g2}$ with the buildup part 320 so as to mold a second buildup part 332.

Upon the buildup welding in the present embodiment, the inclination angle $\theta_5$ may be preliminarily set so as to avoid the interference of the metal deposition welding device 80 with the first projection 12 or the second projection 22, or the first substrate 11 or the second substrate 21. The attitude of the metal deposition welding device 80 with respect to the first member 10 and the second member 20 may be changed as necessary, or the attitude of the first member 10 and the second member 20 with respect to the metal deposition welding device 80 may be changed as necessary.

FIG. 15 is a perspective view showing a state of the first member 10 and the second member 20 after the buildup surface finishing step S105 is executed in the second embodiment. In the present embodiment, the buildup surface exposed to the outside in the first buildup part 331 and the second buildup part 332 includes a top surface 330a and two side surfaces 330c. The top surface 330a is a surface formed along the first top surface 12a of the first projection 12 and the second top surface 22a of the second projection 22. The side surfaces 330c are surfaces formed along the respective first projection side surfaces 12c of the first projection 12 and the respective second projection side surfaces 22c of the second projection 22. The buildup surface finishing step S105 may first finish the top surface 330a so as to be smoothly integrated with the first top surface 12a and the second top surface 22a. The buildup surface finishing step S105 may then finish the two side surfaces 330c so as to be smoothly integrated with the respective first projection side surfaces 12c and the respective second projection side surfaces 22c.

The region of the surface to be finished in the buildup surface finishing step S105 is not necessarily strictly limited to the surface of the first buildup part 331 or the second buildup part 332. The corresponding region may include part of the first top surface 12a or the second top surface 22a, or part of the respective first projection side surfaces 12c or the respective second projection side surfaces 22c around the first buildup part 331 or the second buildup part 332. In the joint method according to the present embodiment, the buildup surface finishing step S105 is not necessarily executed, as in the case of the first embodiment.

In the joint method according to the present embodiment as described above, the respective first inclined surfaces 12f may be inclined to the joint surface perpendicular to the joint direction between the first projection 12 and the second projection 22 about the first axis AX1 intersecting the surface of the first substrate 11. Similarly, the respective second inclined surfaces 22f may be inclined to the joint surface about the second axis AX2 intersecting the surface of the second substrate 21.

The joint method described above can achieve the effects similar to those of the joint method according to the first embodiment.

In the joint method according to the present embodiment, the first projection 12 may include the first projection end surface 12b opposed to the second member 20, and the second projection 22 may include the second projection end surface 22d opposed to the first member 10. The groove formation step S101 in this case may leave part of the first projection end surface 12b to form the first inclined surfaces 12f, and leave part of the second projection end surface 22b to form the second inclined surfaces 22f. The remaining first projection end surface 12b and the remaining second projection end surface 22b may be opposed to each other.

According to the joint method as described above, the first groove region $R_{g1}$ and the second groove region $R_{g2}$ surrounded by the respective first inclined surfaces 12f and the respective second inclined surfaces 22f are each formed partly on each side of the first projection 12 and the second projection 22. In other words, the volume of each of the first groove region $R_{g1}$ and the second groove region $R_{g2}$ is smaller than the volume of the groove region $R_g$ formed in the groove formation step S101 in the first embodiment such that the first projection end surface 12b and the second projection end surface 22b are entirely removed. The joint method according to the present embodiment can reduce the amount of heat applied to the first member 10 or the second member 20 during the welding as compared with the joint method according to the first embodiment.

While the present disclosure has been illustrated above with the preferred embodiments, it should be understood that the present disclosure is not intended to be limited to these embodiments, and various modifications and changes can be made within the scope of the disclosure.

REFERENCE SIGNS LIST

10 FIRST MEMBER
11 FIRST SUBSTRATE
12 FIRST PROJECTION
12b FIRST PROJECTION END SURFACE
12d FIRST INCLINED SURFACE
12f FIRST INCLINED SURFACE
12e FIRST CURVED SURFACE
20 SECOND MEMBER
21 SECOND SUBSTRATE
22 SECOND PROJECTION
22b SECOND PROJECTION END SURFACE
22d SECOND INCLINED SURFACE
22f SECOND INCLINED SURFACE
22e SECOND CURVED SURFACE
30 WELDED PART
31 BASE
33 BUILDUP PART
70 LASER WELDING DEVICE
80 METAL DEPOSITION WELDING DEVICE
81 LASER TORCH
AX1 FIRST AXIS
AX2 SECOND AXIS
J JOINT POSITION
LB LASER BEAM
$R_g$ GROOVE REGION
$R_{g1}$ FIRST GROOVE REGION
$R2_g$ SECOND GROOVE REGION
$\theta_1$ INCLINATION ANGLE OF FIRST INCLINED SURFACE AND SECOND INCLINED SURFACE
$\theta_2$ INCLINATION ANGLE OF OUTER WALL OF TIP END PART OF LASER TORCH

What is claimed is:

1. A joint method of bringing a first member into contact with a second member, the method comprising:
    removing a first part of a first projection of a first substrate, wherein the first projection is opposed to a second projection of a second substrate; and
    removing a second part of the second projection opposed to the first projection to form a groove region between the first projection and the second projection, wherein the first member and the second member each have a thickness that varies depending on parts at a joint position;
    joining the first member and the second member to each other by butt welding after the first part and the second part are removed; and
    filling the groove region by buildup welding after the joining,
    wherein the removing the first part forms a first inclined surface in the first projection facing the groove region to be gradually distant from a joint position joined with the second projection so as to be closer to an outer surface of the first projection, and
    wherein removing the second part forms a second inclined surface in the second projection facing the groove region to be gradually distant from the joint position joined with the first projection so as to be closer to an outer surface of the second projection.

2. The joint method according to claim 1, wherein:
    the first inclined surface is separate from the first substrate, and
    the second inclined surface is separate from the second substrate.

3. The joint method according to claim 1, wherein the butt welding is executed using high-density energy as a heat source.

4. The joint method according to claim 1, wherein the buildup welding is executed by use of a metal deposition-type second welding device using a laser beam as a heat source.

5. The joint method according to claim 4, wherein:
the metal deposition-type second welding device includes a laser torch for emitting the laser beam;
an inclination angle of the first inclined surface with respect to a projecting direction of the first projection and an inclination angle of the second inclined surface with respect to a projecting direction of the second projection are each equal to an inclination angle of an outer wall composing a tip end part of the laser torch, or each greater than the inclination angle of the outer wall; and
a gap between the first inclined surface and the second inclined surface is determined such that the laser torch emitting the laser beam is not brought into contact with the first inclined surface or the second inclined surface.

6. The joint method according to claim 4, wherein:
the first inclined surface is continuously connected to a surface of the first substrate via a first curved surface; and
the second inclined surface is continuously connected to a surface of the second substrate via a second curved surface.

7. The joint method according to claim 1, wherein:
the first inclined surface is a surface inclined to a joint surface perpendicular to a joint direction between the first projection and the second projection about a first axis intersecting a surface of the first substrate; and
the second inclined surface is a surface inclined to the joint surface about a second axis intersecting a surface of the second substrate.

8. The joint method according to claim 7, wherein:
the first projection includes a first projection end surface opposed to the second member;
the second projection includes a second projection end surface opposed to the first member;
the removing the first part leaves part of the first projection end surface to form the first inclined surface;
the removing the second part leaves part of the second projection end surface to form the second inclined surface; and
the remaining first projection end surface and the remaining second projection end surface are opposed to each other.

9. The joint method according to claim 1, further comprising, flattening unevenness caused at a welded part welded in the joining to prepare a base corresponding to a part to be welded.

10. The joint method according to claim 1, further comprising, finishing a surface of a buildup part filled and molded in the groove region.

* * * * *

UNITED STATES PATENT AND TRADEMARK OFFICE
CERTIFICATE OF CORRECTION

PATENT NO. : 11,958,138 B2
APPLICATION NO. : 17/233631
DATED : April 16, 2024
INVENTOR(S) : Eriko Hato et al.

Page 1 of 1

It is certified that error appears in the above-identified patent and that said Letters Patent is hereby corrected as shown below:

On the Title Page

After item (30) Foreign Application Priority Data, delete "2018-200600" and insert --2018-200660--, therefore.

Signed and Sealed this
Twenty-ninth Day of April, 2025

Coke Morgan Stewart
*Acting Director of the United States Patent and Trademark Office*